United States Patent
Portase et al.

(10) Patent No.: US 12,437,073 B2
(45) Date of Patent: Oct. 7, 2025

(54) SYSTEMS AND METHODS FOR COUNTERING PERSISTENT MALWARE

(71) Applicant: Bitdefender IPR Management Ltd., Nicosia (CY)

(72) Inventors: Radu M. Portase, Cluj-Napoca (RO); Gheorghe F. Hajmasan, Cluj-Napoca (RO); Alexandra Hajmasan, Cluj-Napoca (RO)

(73) Assignee: Bitdefender IPR Management Ltd., Nicosia (CY)

(*) Notice: Subject to any disclaimer, the term of this patent is extended or adjusted under 35 U.S.C. 154(b) by 185 days.

(21) Appl. No.: 18/461,134

(22) Filed: Sep. 5, 2023

(65) Prior Publication Data
US 2025/0077672 A1  Mar. 6, 2025

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01); *G06F 2221/034* (2013.01)

(58) Field of Classification Search
CPC .......... G06F 21/566; G06F 21/554; G06F 2221/033; G06F 2221/034
See application file for complete search history.

(56) References Cited

U.S. PATENT DOCUMENTS

| | | | |
|---|---|---|---|
| 7,941,850 B1 | 5/2011 | Satish | |
| 9,392,015 B2 | 7/2016 | Thomas | |
| 9,628,507 B2 | 4/2017 | Haq | |
| 9,894,085 B1 | 2/2018 | Dmitriyev | |
| 10,019,581 B2 | 7/2018 | Tripp | |
| 10,089,465 B2 | 10/2018 | Hajmasan | |
| 10,225,280 B2 | 3/2019 | Vu | |
| 10,289,841 B2 | 5/2019 | Tang | |
| 10,360,381 B2 | 7/2019 | Barak | |
| 10,706,151 B2 | 7/2020 | Hajmasan | |

(Continued)

FOREIGN PATENT DOCUMENTS

EP   3220307 A   9/2017

OTHER PUBLICATIONS

European Patent Office (EPO), International Search Report and Written Opinion mailed Oct. 25, 2024 for PCT International Application No. PCT/EP2024/073954, international filing date Aug. 27, 2024.

(Continued)

*Primary Examiner* — Tri M Tran
(74) *Attorney, Agent, or Firm* — Law Office of Andrei D Popovici, PC

(57) ABSTRACT

Some embodiments construct an entity map describing a group of inter-related entities and determine whether a computing device comprises malware according to the respective entity map. The entity map includes worker entities (e.g., processes) and resource entities (e.g., files) accessed by the respective worker entities. Some entity maps are persistently stored and recovered in response to a reboot, enabling a complete reconstruction of a kill chain even when malicious activities are distributed among multiple entities and multiple computing sessions. Some embodiments detect infection by comparing a current entity map with a signature map describing at least a fragment of a known attack.

23 Claims, 16 Drawing Sheets

(56) References Cited

U.S. PATENT DOCUMENTS

| | | |
|---|---|---|
| 11,005,877 B2 | 5/2021 | Bronshtein |
| 11,146,578 B2 | 10/2021 | Lem |
| 11,184,374 B2 | 11/2021 | Shu |
| 11,250,126 B2 | 2/2022 | Strogov |
| 11,303,654 B2 | 4/2022 | Ray |
| 2012/0192273 A1 | 7/2012 | Turbin |
| 2013/0055339 A1 | 2/2013 | Apostolescu |
| 2015/0101049 A1* | 4/2015 | Lukacs ............... H04L 63/14 726/23 |
| 2016/0042179 A1 | 2/2016 | Weingarten |
| 2017/0206358 A1 | 7/2017 | Barak |
| 2018/0357413 A1 | 12/2018 | Rivera |
| 2019/0306719 A1 | 10/2019 | Chari |
| 2020/0193031 A1 | 6/2020 | Avraham |
| 2020/0380127 A1 | 12/2020 | Das |
| 2021/0067531 A1 | 3/2021 | Meir |
| 2021/0243208 A1 | 8/2021 | Rubin |
| 2022/0318377 A1* | 10/2022 | Edwards ............ G06F 21/552 |

OTHER PUBLICATIONS

U.S. Appl. No. 18/461,251, filed Sep. 5, 2023, which is a continuation of U.S. Appl. No. 18/461,134 (the present application).
European Patent Office (EPO), International Search Report and Written Opinion mailed Nov. 12, 2024 for PCT International Application No. PCT/EP2024/073956, international filing date Aug. 27, 2024.

* cited by examiner

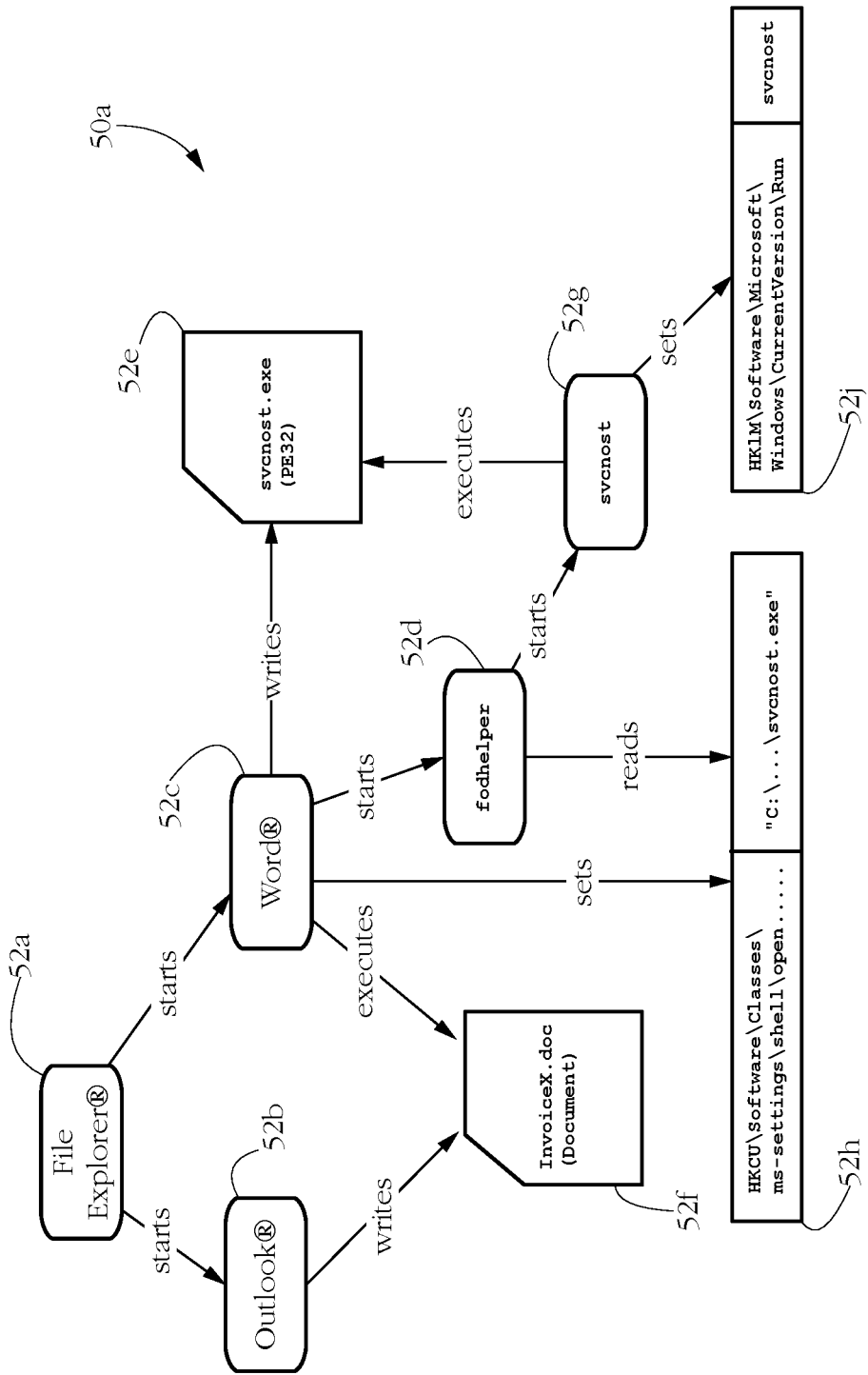
FIG. 5-A

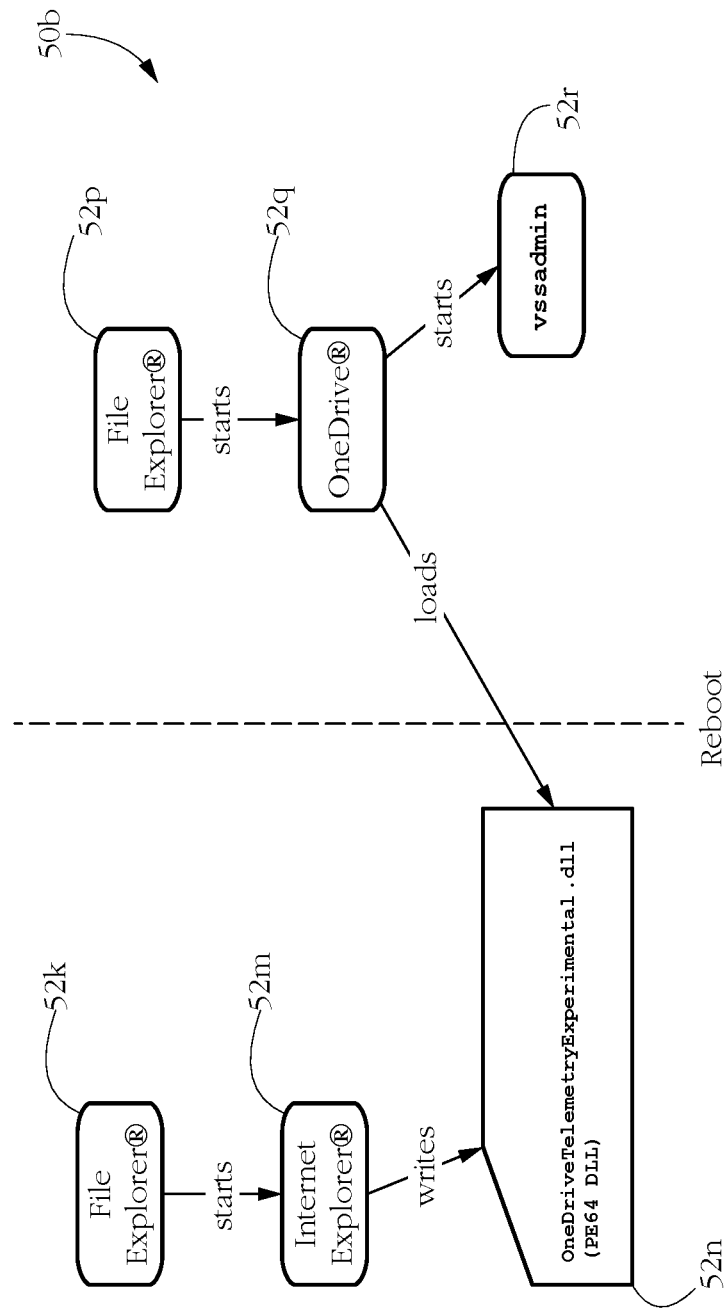
FIG. 5-B

```
{
    "Entities":  [
    "Worker1":  {
                "ExecutablePath" : {"Contains" : "Outlook.exe"},        ⎫
                "VersionInfo": {                                         ⎬ 62
                        "CompanyName":  {"Equals" : "Microsoft Corporation"}
                },
    }, "Resource1": {
            "Type": "word document",
    }

]
    ┌─────────────────────────────────────┐
    │ "RootNode" :      "Worker1"         │ 63
    └─────────────────────────────────────┘
    "Relations": [
        {
            "From": "Worker1",
            "To":"Resource1",
            "Type":"Drop"
        }
    ]
    ┌─────────────────────────────────────┐
    │ "OnMatch":   [                      │
    │     {                               │
    │         "Target" : "Resource1",     │
    │         "Action" : "SetFlag",       │ 64
    │         "Flag"   : "HasExternalOrigin"│
    │     },                              │
    │     {                               │
    │         "Target" : "Map",           │
    │         "Action" : "Persist",       │
    │         "Policy" : "ShortStorage"   │
    │     }                               │
    │ ]                                   │
}   └─────────────────────────────────────┘
```

SYSTEMS AND METHODS FOR COUNTERING PERSISTENT MALWARE

BACKGROUND OF THE INVENTION

The invention relates to computer security, and in particular to detecting malicious software and intrusion.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to extortion, loss of data and sensitive information, identity theft, and loss of productivity, among others. Malware may further display material that is considered by some users to be obscene, excessively violent, harassing, or otherwise objectionable. The explosive growth in mobile computing has only exacerbated exposure and the associated risks, with millions of devices such as smartphones and tablet computers constantly connected to the Internet and acting as potential targets for malware.

Security software may be used to detect malware infecting a user's computer system, and additionally to remove or prevent the execution of such malware. Several malware-detection techniques are known in the art. Some rely on matching a fragment of code of the malware agent to a library of malware-indicative signatures. Other conventional methods detect a malware-indicative behavior, such as a particular sequence of actions performed by the malware agent. Recent methods use artificial intelligence (AI) technologies such as various kinds of artificial neural networks to analyze software behavior for malware detection.

However, some advanced malware manages to evade detection. One detection avoidance strategy involves dividing malicious activities among a plurality of software agents, wherein each agent performs a separate set of actions which are not particularly indicative of malice when isolated from the actions of other agents. An exemplary method of countering such threats is described in U.S. Pat. No. 10,706,151 B2, by G. Hajmasan et. al., titled "Systems and Methods for Tracking Malicious Behavior Across Multiple Software Entities," which proposes grouping together entities related by filiation and/or code injection relations, so that actions of individual group members may be attributed to the group as a whole.

Even more sophisticated malware attacks may occur in stages, wherein some of the actions that make up a malicious chain may be separated by relatively long time periods, such as a few weeks or even months. In one such example, an unsuspecting user may download a file comprising malicious code by following a link embedded within an email message. The malicious code may lay dormant on the user's computer until it is invoked by some other software agent and/or it is activated remotely by a malicious command-and-control server.

Conventional monitoring tools may fail to detect such malware. There is therefore an ongoing interest in developing robust and efficient computer security systems and methods capable of countering sophisticated cyber threats.

SUMMARY OF THE INVENTION

According to one aspect, a computer system comprises at least one hardware processor configured to execute an entity map manager and a malware detection engine connected to the entity map manager. The entity map manager is configured to construct entity maps specifying groups of inter-related software entities. The entity map manager is further configured to, in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and update the entity map by adding a specification of the worker entity to the entity map. The entity map further includes a specification of another worker entity having executed on the computer system prior to the reboot and a specification of a relation between the other worker entity and the resource entity. The malware detection engine is configured to determine whether the computer system comprises malicious software according to the updated entity map.

According to another aspect, a computer security method comprises employing at least one hardware processor to execute an entity map manager and a malware detection engine connected to the entity map manager. The entity map manager is configured to construct entity maps specifying groups of inter-related software entities. Executing the entity map manager comprises employing the at least one hardware processor to, in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and update the entity map by adding a specification of the worker entity to the entity map. The entity map further includes a specification of another worker entity having executed on the computer system prior to the reboot and a specification of a relation between the other worker entity and the resource entity. Executing the malware detection comprises employing the at least one hardware processor to determine whether the computer system comprises malicious software according to the updated entity map.

According to another aspect, a non-transitory computer-readable medium stores instructions which, when executed by at least one hardware processor of a computer system, cause the computer system to form an entity map manager and a malware detection engine connected to the entity map manager. The entity map manager is configured to construct entity maps specifying groups of inter-related software entities. The entity map manager is further configured to, in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and update the entity map by adding a specification of the worker entity to the entity map. The entity map further includes a specification of another worker entity having executed on the computer system prior to the reboot and a specification of a relation between the other worker entity and the resource entity. The malware detection engine is configured to determine whether the computer system comprises malicious software according to the updated entity map.

BRIEF DESCRIPTION OF DRAWINGS

The foregoing aspects and advantages of the present invention will become better understood upon reading the following detailed description and upon reference to the drawings where:

FIG. 5-A shows an exemplary realistic entity map according to some embodiments of the present invention.

FIG. 5-B shows another exemplary entity map according to some embodiments of the present invention.

FIG. 14 shows an exemplary computer-readable encoding of a map signature according to some embodiments of the present invention.

DETAILED DESCRIPTION OF THE INVENTION

Figure 1:
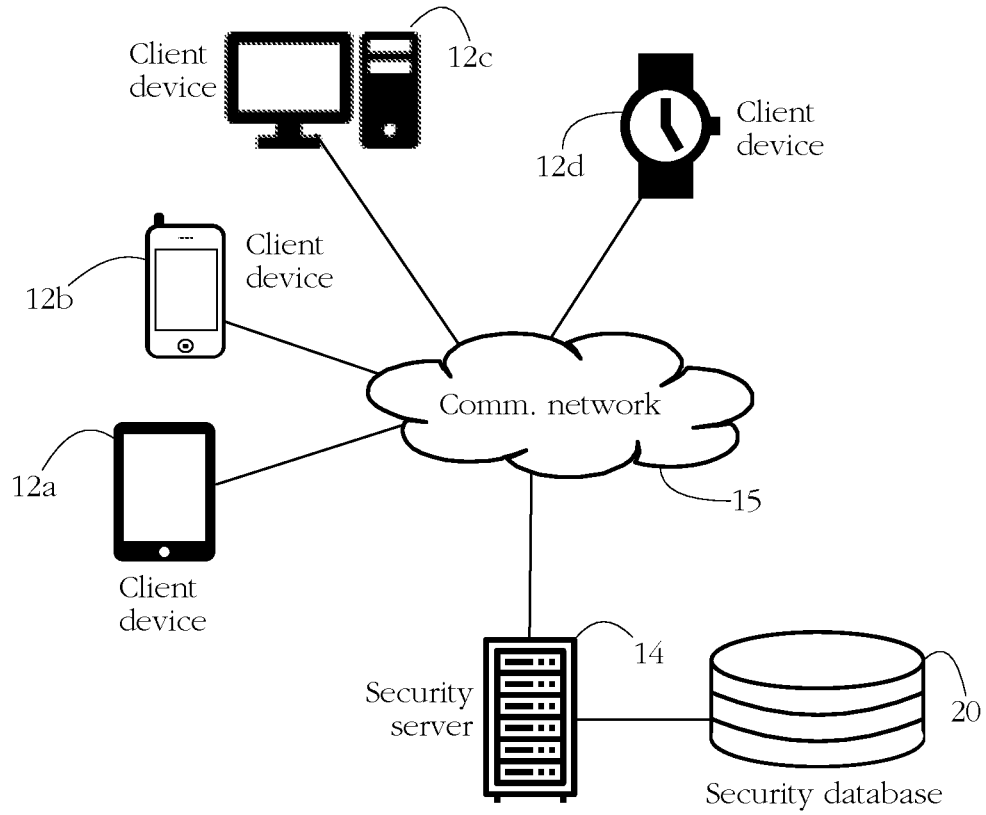
FIG. 1 shows a plurality of client devices protected from malware according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program and is characterized by having at least an execution thread and a virtual memory space assigned to it, wherein a content of the respective virtual memory space includes executable code. The term 'reboot' denotes a restart of a computer or of an operating system executing on the respective computer. A computing session herein comprises computations performed in between consecutive reboots. A database herein denotes any organized, searchable collection of data. A predicate herein denotes a statement that has a variable degree of truth depending on the values of its variables. Evaluating a predicate comprises determining the truth value of the respective predicate. A graph herein denotes a plurality of nodes interconnected by edges. A subgraph of a graph is another graph formed from a subset of the nodes and edges of the respective graph. Two graphs A and B are herein said to be isomorphic if there exists a one-to-one mapping between the nodes of A and the nodes of B wherein adjacent nodes of A are mapped to adjacent nodes of B. Computer-readable media encompass non-transitory media such as magnetic, optic, and semiconductor storage media (e.g., hard drives, optical disks, flash memory, DRAM), as well as communication links such as conductive cables and fiber optic links. Volatile media (e.g., DRAM) retain their content only while powered, in contrast to non-volatile media (e.g., magnetic hard disk, flash memory) whose contents persist when powered down. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

FIG. 1 shows a plurality of client devices 12a-d protected against malware according to some embodiments of the present invention. Exemplary client devices 12a-d include personal computer systems, corporate mainframe computers, mobile computing platforms (e.g., laptop computers, tablets, smartphones), entertainment devices (e.g., TVs, game consoles), wearable devices (e.g., smartwatches, fitness bands), household appliances (e.g., thermostats, refrigerators), and any other electronic device comprising a processor, a memory, and a communication interface enabling the respective device to communicate with other devices/computer systems. In some embodiments, each client device 12a-d includes a security module configured to detect malicious software. The security module may be embodied as a set of connected computer programs executing on a processor of the respective device.

Exemplary client devices 12a-d are connected to a communication network 15, which may include a local area network (e.g., home network, corporate network, etc.), a wide-area network and/or the Internet. Network 15 generically represents a set of hardware (physical layer) and software interfaces enabling the transfer of data between devices 12*a-d* and other entities connected to network 15.

FIG. 1 further shows a security server 14 connected to communication network 15. Server 14 generically represents a set of communicatively coupled computer systems, which may or may not be in physical proximity to each other. In some embodiments as described below, security modules executing on each client device 12*a-d* may collaborate with server 14 to protect each respective device. Stated otherwise, computer security activities may be divided between a component of the respective device and server 14. For instance, server 14 may validate a preliminary verdict of malice provided by a local instance of a computer security module executing on each respective device 12*a-d*, as further described below. Server 14 may protect multiple client devices 12*a-d* e.g., according to a service agreement/subscription, etc.

Figure 2:
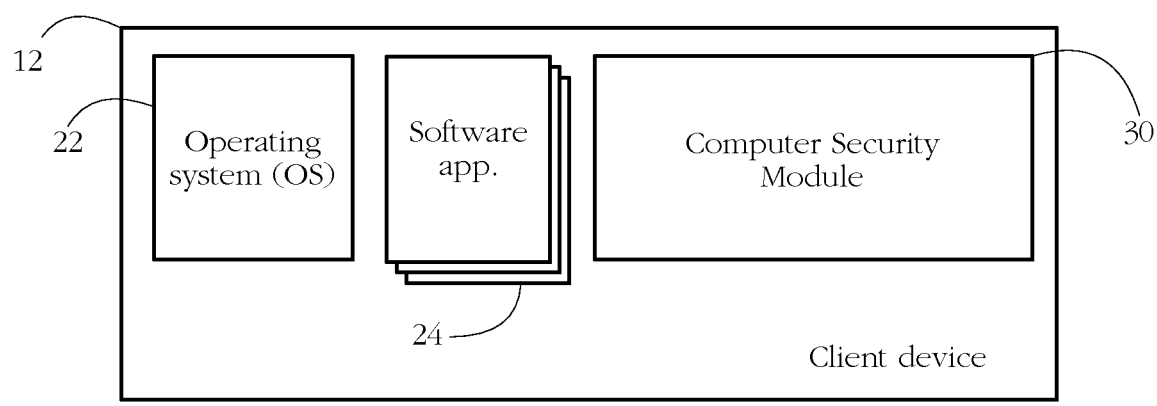
FIG. 2 illustrates exemplary software executing on a client device according to some embodiments of the present invention.

FIG. 2 shows exemplary software executing on a client device 12, which generically represents any of the client devices 12*a-d* in FIG. 1. An operating system (OS) 22 provides an interface between the hardware of client device 12 and other computer programs such as a set of software applications 24 executing on the respective device. Exemplary operating systems include, among others, Windows®, Linux®, iOS®, and Android®. Software applications 24 generically represent any computer program, such as word processing, image processing, spreadsheet, calendar, gaming, social media, web browser, and electronic communication applications, among others.

In some embodiments, a computer security module 30 protects client device 12 against computer security threats such as malicious software and intrusion. The following description will focus on exemplary embodiments wherein module 30 comprises a set of computer programs, i.e., software executing on a processor of client device 12. However, a skilled artisan will know that the present description may be adapted to alternative embodiments wherein module 30 is implemented in hardware or a combination of hardware and software, without affecting the scope of the present invention. Module 30 may form a part of a larger security suite also providing traffic control (e.g., firewall, parental control) and spam control services, among others.

In some embodiments, computer security module 30 is configured to monitor the behavior of a set of software entities executing on client device 12 and determine whether the respective behavior is indicative of malice. Monitoring software behavior herein comprises detecting a set of events caused by the execution of the respective software and analyzing the respective events as shown in detail below. Exemplary monitored software entities include individual processes belonging to OS 22 and/or to software applications 24. A single instance of security module 30 may be configured to monitor multiple (e.g., hundreds) of target entities concurrently.

Figure 3:
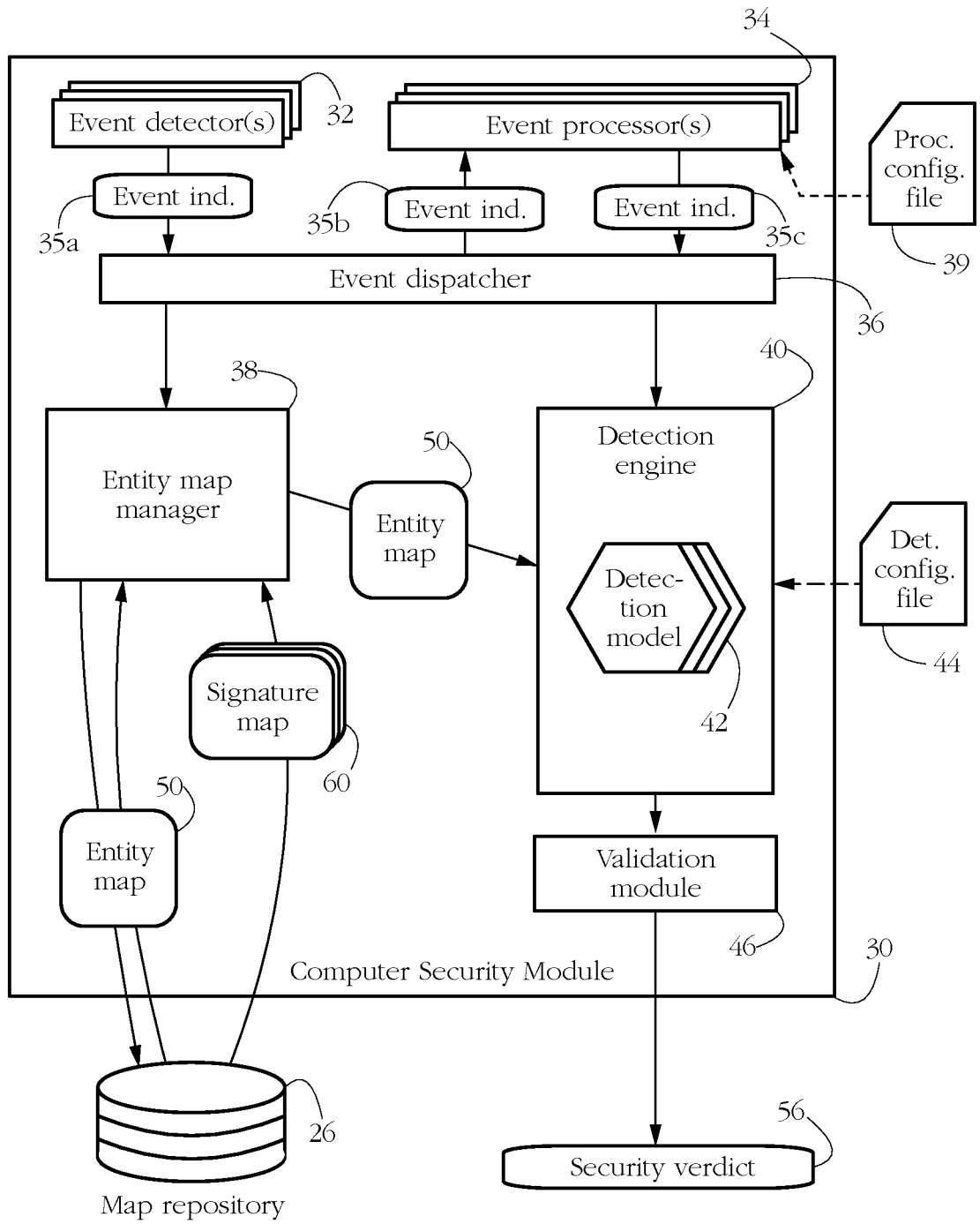
FIG. 3 shows exemplary components of a computer security module according to some embodiments of the present invention.

FIG. 3 shows exemplary components of computer security module 30 according to some embodiments of the present invention. Module 30 comprises a detection engine 40 configured to selectively apply a plurality of available detection models 42 to determine whether client device 12 comprises malicious software. Exemplary detection models 42 may output a provisional verdict (e.g., clean/malicious) or a numerical score indicative of a likelihood that a respective target entity or group of entities is malicious. Some embodiments of detection engine 40 may aggregate malware-indicative scores output by multiple detection models 42 and determine whether a respective entity or group of entities is malicious by comparing the resulting aggregate score to a pre-determined threshold.

Models 42 may implement any malware-detection method known in the art. For instance, models 42 may embody a set of malware-detection heuristics, i.e., sets of rules for determining whether a target software entity/group is malicious. Exemplary heuristics may determine that an entity is malicious if it carries out a particular action or sequence of actions, such as reading a file, encrypting its contents, and storing the encrypted content on disk. Other exemplary heuristics may evaluate various security predicates according to characteristics of a target entity or according to an event caused by executing a target entity. For instance, an exemplary heuristic may determine whether a path of a file accessed by a target entity coincides with the location of a Chrome® password file, etc. Distinct models 42 may correspond to distinct heuristics. In yet another example, each model 42 may comprise an artificial intelligence (AI) system such as a set of pre-trained artificial neural networks configured to receive a set of characteristic features of a target entity and to determine whether the respective entity is malicious according to said characteristics.

In some embodiments, distinct detection models 42 may apply to distinct types of monitored entities. For instance, Microsoft Word® macros may be monitored using a detection model distinct from another model used to monitor regular portable executables. In some embodiments, there may be multiple detection models 42 applicable to the same type of entity. However, the respective models may differ in the actual malware-detection methods employed and/or in the computational costs involved in monitoring. In one such example, detection engine 40 may use a relatively simple set of heuristics (i.e., an initial detection model 42) to monitor a target entity/group, and switch to using a more computationally expensive set of heuristics (i.e., another detection model 42) in response to an output of the initial model indicating a suspicion of malice, or in response to a signature match as described below. In some embodiments, a detection configuration file 44 may store data associating detection models 42 with entity types and/or entity behavior patterns, as well as configuration parameter values such as score values and increments, detection thresholds, and flags, among others. The content of configuration file 44 may vary among client devices 12*a-d* and/or among distinct users of each respective device. Detection models 42 and the operation of detection engine 40 will be further detailed below.

In behavior-oriented embodiments, detection models 42 receive input indicative of a set of behavioral features of a monitored entity/group, said features characterizing actions of the respective entity/group such as opening a file, changing an access permission, launching a child process, injecting code into another software entity, sending an electronic communication (e.g., an HTTP request for a remote resource), etc. Such behavior may be detected via a set of computing events caused by the execution of the respective entity (ies).

In some embodiments, computing events are detected by an event processing infrastructure comprising a set of event detectors 32, a set of event processors 34, and an event dispatcher 36 connected to event detectors 32 and event processors 34 (FIG. 3). The event processing infrastructure may comprise any implementation of a message delivery system. For instance, components 32-34-36 may register callbacks to be notified whenever a specific event occurs on client device 12, and further associate each event with a software entity causing the respective event.

Event detectors 32 comprise hardware and/or software devices configured to detect various events occurring during execution of software on client device 12. Some detectors 32 may specialize in detecting particular types or categories of events. Exemplary detected events include application installs, uninstalls, and updates, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary detected events may include receiving a request to access a peripheral device (e.g., hard disk, SD card, network adapter, microphone, camera), receiving an incoming communication (e.g., a short message service-SMS message), a request to access a remote resource (e.g., a hypertext transfer protocol-HTTP request to access a particular URL, an attempt to access a document repository over a local network), a request formulated in a particular uniform resource identifier scheme (e.g., a mailto: or an ftp: request), and an attempt to send an electronic message (e.g., email, SMS, etc.), among others. Yet other exemplary events comprise moving a user interface/window of target application 24 in and/or out of focus/foreground.

Some embodiments of event detectors 32 may further detect various timing-related events, such as periods of inactivity, i.e., time gaps between events and/or time intervals when the respective client device is idle, registers no user activity, or carries out only internal system tasks. Such inactive periods may be further differentiated into short time gaps (e.g., of the order of a seconds) and long time gaps (e.g., of the order of minutes to hours). Other timing-related events may include, for instance, a sequence of events occurring in quick succession/bursts of activity.

Exemplary events specific to, or particularly relevant to the security of, mobile devices include screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

Such event detection may be device-type-specific. In one example wherein client device 12 is a personal or laptop computer, upon detecting a creation of target entity, event detectors 32 register the respective entity and/or its associated set of processes with an event logging service of OS 22 (e.g., event tracking for Windows®-ETW, Syslog in UNIX®). In response, event detectors 32 may receive notifications of various events occurring during execution of the respective processes, either in real time or in log form. Event logging tools typically generate a list of event descriptors including a timestamp for each event, a numerical code identifying an event type, an indicator of a type of process or application that generated the respective event, and other event parameters. In such embodiments, detectors 32 may detect the occurrence of a target event by parsing the respective event log.

In another example, a specialized event detector 32 may modify a set of native functions of OS 22 by inserting redirecting instructions (also known as hooks or patches). In this manner, when a process executing on client device 12 calls the respective OS function, execution is redirected to a callback routine notifying detector 32 of an attempt to execute the respective OS function. When the hooked function is instrumental in a monitored event (e.g., file creation, process launch, etc.), an attempt to call the respective function may serve as an indicator of the occurrence of the respective event.

In yet another example of event detection, electronic communications sent by the respective client device may be detected by installing a specialized event detector 32 as a proxy module configured to intercept domain name service (DNS) queries and/or HTTP requests transmitted by the client device 12.

Some operating systems such as those executing on smartphones, wearables, etc., may not allow such manipulations. However, other tools may be available to detect the occurrence of various events. For instance, some OSs expose an application programming interface (API) that enables registering callbacks for different notifications, inspecting network traffic, SMS/MMS manipulation, detecting access to storage devices (e.g., SD card), etc. Some embodiments of event detectors 32 use functions of an accessibility API to access on-screen content and detect user interactions with the respective device and/or applications.

In some embodiments, event detectors 32 notify event dispatcher 36 in response to the occurrence of a respective event, for instance by transmitting an event indicator 35*a* (FIG. 3). Dispatcher 36 is configured to centralize event notifications from detectors 32 and distribute or otherwise make such information accessible to other components of computer security module 30. Dispatcher 36 is further configured to maintain a mapping/association between each detected event and a target software entity causing the respective event. Data associating each event with a target entity may be provided by event detectors 32 and/or event processors 34. In some embodiments, dispatcher 36 stores and/or manages individual events as data structures containing fields/attributes that can be strings, integers, booleans, or bitmaps of flags.

In some embodiments, events may be organized on several semantic levels. Some event detectors 32 may only provide low-level, raw and/or unstructured data. In some embodiments, a set of event processors 34 is configured to analyze and/or aggregate such primary data to infer the occurrence of higher-level events. As such, event processors 34 may receive event indicators 35*b* via dispatcher 36 and contribute other event notifications 35*c* to dispatcher 36 with (FIG. 3). In one example, an event processor 34 may add attribute values/metadata to an event detected by detectors 32. For instance, when event indicator 35*b* communicates receiving an SMS, an exemplary event processor may determine whether the respective SMS includes a hyperlink and return such information in updated event indicator 35*c*. In a more sophisticated example, event processors 34 may use artificial intelligence (e.g., natural language processing, computer vision, etc.) or other means of analyzing a content displayed on screen, to determine whether the respective target entity is displaying a login form, a payment interface, an advertisement, etc. In yet another example, some event processors 34 may combine information about multiple events to determine whether an aggregate, higher-level event has occurred.

Event processors 34 may be organized in multiple layers, so that the output of one layer is further fed to event processors in another layer. Such hierarchical event processing architectures may characterize detected events efficiently and with customizable granularity and complexity. In some embodiments, distinct event processing layers may correspond to different event semantic levels. For instance, distinct processing layers may essentially respond to different questions, such as how, what, and why a target entity has performed a specific action. In one such example, the event processing infrastructure of security module 30 is configured to detect an event comprising copying a file to a Windows® startup folder. To perform such an operation, a target entity may for instance:

A. Call the CopyFile function of the Windows® API

B. Copy chunks of the respective file using a sequence of file read and write commands.

C. Use the COM object IFileOperation::CopyItem to copy the file.

Event detectors 32 may signal the occurrence of low-level events, e.g., an attempt to execute the CopyFile instruction (case A), individual file read and/or writes (case B), a COM call to IFileOperation (case C). A set of event processors 34 may consume such low-level events to determine whether they are indicative of a higher-level file copy event. For instance, in case B, some processors 34 may aggregate multiple detected read/write events and determine whether they involve chunks of the same file. When yes, the respective event processors may transmit event indicator 35c notifying event dispatcher of the occurrence of a file copy event. Another event processor 34 may then ingest the file copy event and determine whether it is indicative of an attempt to copy a file into the startup folder, and when yes, generate another event indicator notifying dispatcher 36 accordingly.

In some embodiments, to save computing resources, some event processors 34 may be selectively activated and/or de-activated, for instance according to a type of target entity being monitored. A selected processor 34 may also be de-activated for instance when no other event processor or detection model 42 currently uses its output. Some embodiments may use an event processor configuration file 39 to specify inter-dependencies between event processors 34 and/or to specify which event processors 34 should be active/inactive according to each type of target entity. Configuration file 39 may be formulated using any data specification standard known in the art, for instance in a version of extensible markup language (XML) or JavaScript® Object Notation (JSON).

The manner in which event information is dispatched to event processors 34 and/or other components of module 30 may vary among embodiments and event types. Exemplary dispatch mechanisms include, for instance, fast dispatch, synchronous dispatch, and/or asynchronous dispatch. In fast dispatch, events are submitted directly to event processors 34 without locking or extra memory allocations. An example comprises dispatching data received from a network traffic sensor registered with a Windows® filtering platform. Event processors 34 ingesting fast dispatch events are typically pre-registered with the associated event detectors, and cannot be dynamically activated or de-activated. In synchronous dispatch, the process/thread causing the respective event is suspended while events are submitted to event processors for analysis, and resumed after the conclusion of the analysis. Thread locking and extra memory allocation further allow event processors 34 to be activated/de-activated dynamically. In asynchronous dispatch, the process/thread causing the respective event is allowed to continue execution, and event notifications are added to a queue ingested by a dedicated processor thread pool. Some event processors 34 and/or detectors 32, for instance handlers of Event Tracing For Windows (ETW) data, may require asynchronous dispatch.

Figure 4:
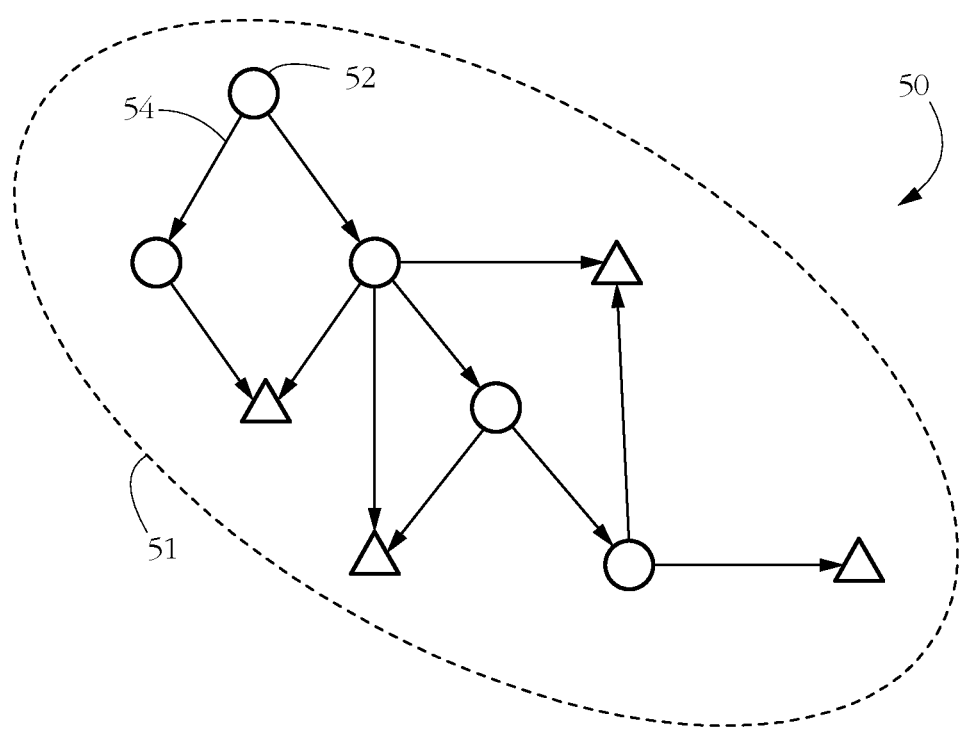
FIG. 4 illustrates a generic, exemplary entity map interconnecting worker entities and resource entities according to some embodiments of the present invention.

In some embodiments, computer security module 30 (FIG. 3) may further comprise an entity map manager 38 connected to event dispatcher 36 and detection engine 40, manager 38 configured to construct and maintain a set of entity maps 50 identifying and describing a group of inter-related monitored software entities. FIG. 4 shows an exemplary generic entity map 50 according to some embodiments of the present invention. Map 50 comprises a computer-readable representation of an entity group 51, map 50 including descriptions of individual group members (entities 52) and pairwise relations 54 between such entities. In some embodiments, map 50 comprises a directed graph having entities 52 as nodes and inter-entity relations as directional edges, as illustrated in FIG. 4.

Entity group 51 includes a set of worker entities shown as circles in FIG. 4. Worker entities comprise computer programs (e.g., individual processes), which may or may not be currently executing on the respective client device. For instance, entity group 51 may include a subset of live entities currently loaded into a volatile memory (e.g., RAM) of client device 12, as well as a subset of entities which have previously executed on device 12 and are currently terminated. In one example wherein a parent process spawns a child process and then quits, an entity group may comprise both the parent and the child processes.

Entity group 51 may further include a set of resource entities shown as triangles in FIG. 4. In contrast to worker entities, resource entities represent static assets stored on non-volatile computer-readable media (e.g., a hard disk used by client device 12), said assets called upon or otherwise accessed by at least one worker entity of group 51. Exemplary resource entities include files and OS registry entries, among others. To illustrate the difference between worker and resource entities in an exemplary embodiment running on a Microsoft Windows® platform, an executing portable executable (PE) is a worker entity, while its disk image (.EXE file) is a resource entity.

Entity map 51 further comprises a set of inter-entity links 54, represented as arrows in FIG. 4. Such links/graph edges represent relations between the respective endpoint entities. In some embodiments, a relation between a couple of entities represents an action that one member of the couple performs on the other. Directional links/edges shown as arrows in FIG. 4 indicate a direction of a respective action, e.g. which entity performs the respective action. Some embodiments distinguish between multiple relation types. Exemplary relations between worker entities include, among others, filiation (a parent entity creates a child entity via spawning, forking, etc.), code injection (i.e., one process writes data into a region of memory currently used by another process), an action wherein one entity reads a content of a memory belonging or used by the other entity, an action wherein one entity enumerates objects (e.g., libraries) loaded by the other entity, an action wherein one entity suspends execution of the other entity, and an action wherein one entity kills/terminates the other entity. Exemplary relations between a worker entity and a resource entity include write/set, modify, read, load, execute, and delete, among others.

A worker entity may be related to a resource entity also because of an action of its parent entity. Some examples occurring on a Windows® platform are given below. In one such example, a parent process first registers a service by setting a specific OS registry key (resource entity). The parent and then instructs the service manager to start said service, thus spawning a child entity. The child may be configured to start automatically after a reboot or may be explicitly started via a service manager API.

In another example, a parent process registers a child process as a task, by using the task scheduler API or by simply writing a task configuration file (resource entity). The parent then instructs the task scheduler to start the child. The child entity may be configured to start at a specific time or to start automatically following a reboot.

In yet another example, a parent entity may cause a debugger service to automatically start a child entity in response to a creation of an arbitrary process, by setting a particular OS registry key (resource entity). Yet other examples may use a Windows Management Instrumentation (WMI) event notification facility. A parent process may register an event consumer and a filter with the WMI by way of a script file (resource entity), thus causing the WMI engine to automatically start a child entity in response to an occurrence of some type of event.

All of the process creation mechanisms described above may be manipulated for malicious purposes, for instance for privilege escalation or masking the source of an attack. It may therefore be instructive from the viewpoint of computer security not only to associate the parent and child entities, but also to associate the child entity with a resource entity that mediated the creation of the respective child. For instance, when a parent entity reads writes a selected resource entity (registry key, script file, configuration file, etc.) before creating a child entity, some embodiments may connect the respective resource entity to both the parent and the child entities within the respective entity map. Such situations are further described below in relation to FIG. 8.

Two realistic examples of entity maps according to some embodiments of the present invention are shown in FIGS. 5-A-B. Entity map 50a in FIG. 5-A illustrates an exemplary scenario wherein a user uses an instance of a File Explorer® application (worker entity 52a) to navigate to and open an instance of Microsoft Outlook® (worker entity 52b), and then uses the respective email client to download a file (resource entity 52f) attached to an email message. At some later time, the user launches an instance of a Microsoft Word® word-processing application (worker entity 52c) and loads the downloaded file. Entity 52f comprises executable code in the form of a macro which, when executed by the respective instance of Word®, causes entity 52c to download and write a malicious executable file (resource entity 52e) to the local disk. The macro code further causes worker entity 52c to set a specific Windows® register key (resource entity 52h) to point to the recently downloaded entity 52e. The malicious macro code within resource entity 52f then causes Word® to launch an instance of an OS utility (worker entity 52d), which in turn reads the value of resource entity 52h therefore enabling a surreptitious privilege escalation, which is a known type of malicious maneuver directed at taking over the respective host. Worker entity 52d then launches a new process (worker entity 52g) which loads resource entity 52e and, as part of its malicious payload, sets another Windows® register key (resource entity 52j) causing a new instance of malicious entity 52g to be launched automatically upon reboot. The illustrated attack manages to persistently infect the user's computer via resource entities 52e and 52j. Having managed to survive even upon reboot, malicious entity 52g may then carry out any activities, for instance parsing the user's keyboard input for passwords, PINs, etc., and transmitting them to a remote server.

Entity map 50b in FIG. 5-B illustrates another exemplary scenario, wherein the user launches a web browser (worker entity 52m) via Windows File Explorer® (worker entity 52k) and then navigates to a malicious webpage which triggers a remote code execution vulnerability of the browser, causing it to download a malicious library (resource entity 52n) to a specific disk location used by local instances of Microsoft OneDrive® cloud hosting clients. A subsequent execution of the OneDrive® client (worker entity 52q started by worker entity 52p) will then load the malicious library which, when executed, will cause a launch of an OS administrative tool (worker entity 52r). Entity 52r may then carry out a ransomware attack, e.g., encrypt and/or delete various user files. The illustrated scenario shows another example of persistent malware, which may survive a reboot by way of resource entity 52n. However, in some embodiments of the present invention, entity map manager 38 is configured to recover map 50b in response to a reboot as shown in detail below, thus enabling a reliable detection of persistent malware.

Entity maps 50 comprising entities currently executing on the respective client device 12 may be stored in a volatile memory. Map manager 38 may dynamically create, edit, and delete entity maps. Editing a map may include adding and removing entities to/from an existing entity group, as well as setting/changing various entity and/or relationship characteristics. Some entity maps may also be stored persistently on non-volatile media (e.g., a storage device as shown below in relation to FIG. 17). In some such embodiments, maps 50 may be stored in a map repository 26 (FIG. 3) comprising a database of records selectively retrievable according to various criteria. The format of a stored entity map may vary. Exemplary embodiments include a record of a relational database and a set of attribute-value pairs expressed in a version of extensible markup language (XML) or Javascript® Object Notation (JSON), among others. A relational database embodiment of map repository 26 may maintain an association between each entity map and its member entities, which enables a selective retrieval of entity maps according to the identity and/or characteristics of a member.

Figure 6:
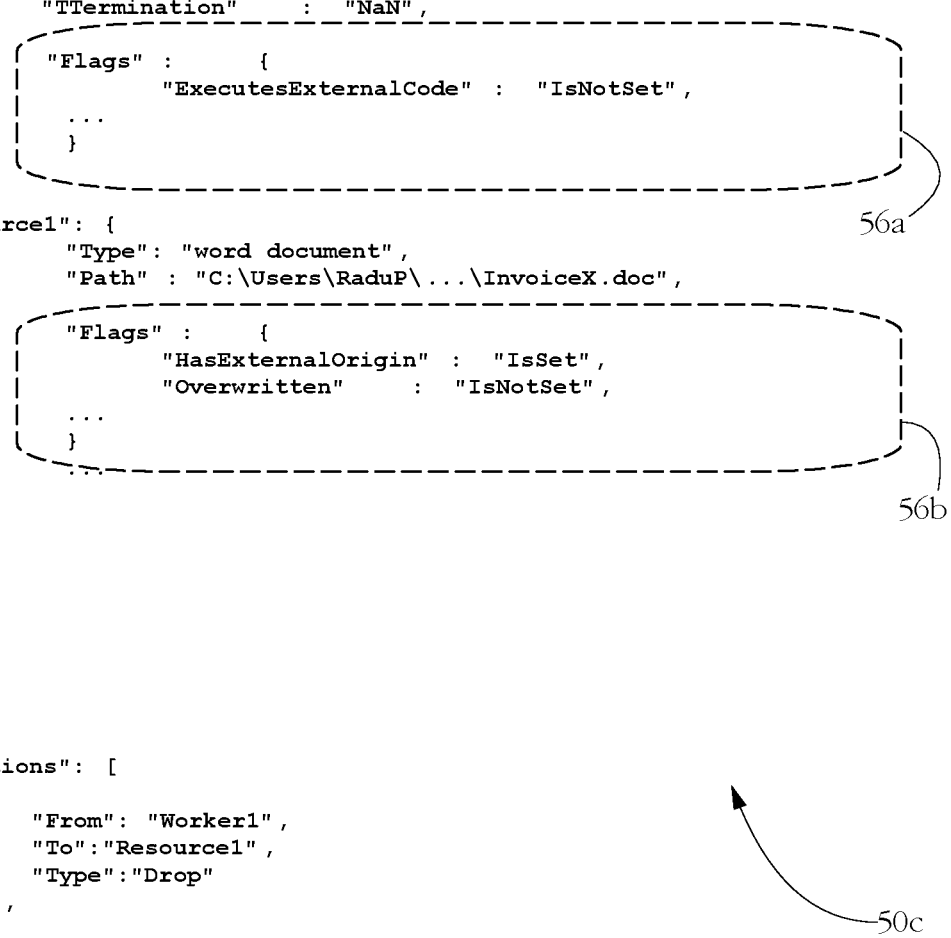
FIG. 6 shows an exemplary computer-readable encoding of an entity map according to some embodiments of the present invention.

FIG. 6 shows an exemplary computer-readable specification of an entity map 50c according to some embodiments of the present invention. The illustrated format comprises a hierarchical data structure including a set of attribute-value pairs characterizing the respective entity map. The specification of entity map 50c comprises a section itemizing members of the respective entity group, and another section itemizing pairwise relations between entities, as illustrated. An artisan will know that the chosen format, choice, and naming of attributes is only illustrative and not meant to be limiting. Each worker entity may be characterized by attributes such as an identifier (e.g., process ID, hash of memory image, etc.) of the respective process, a location/path of an executable file for launching the respective entity, and an entity type indicator (e.g., portable executable, shell script, etc.). Worker entities may further be characterized by, among others, an indicator of a version of the respective program and a set of timestamps indicating for instance, a time of launch and/or termination of the respective entity.

Resource entities may be characterized by exemplary attributes such as a resource type (e.g., Word® document, portable document format-PDF file, portable executable, dynamic link library-DLL, OS registry key, etc.), a location of the respective entity (local path, network address, uniform resource locator-URL, etc.), and a set of timestamps indicating a time of creation and/or latest modification of the respective entity.

In some embodiments, an entity may be further characterized by a set of security flags such as exemplary flags 56a-b in FIG. 6. Such flags may indicate, for instance, whether a respective worker entity is executing code from a source external to the respective client device, or whether a content of a respective resource entity has changed since its addition to the respective entity map. Such flags may be used by detection engine 40 to determine whether client device 12 comprises malicious software. For instance, engine 40 may use the knowledge that a file has been downloaded from the Internet to mark a worker entity loading the respective file as potentially malicious. In some embodiments, security flags 56a-b may be set by entity map manager 38 and/or detection engine 40 in response to various events related to the respective entities and/or in response to map signature matches as shown in more details below.

In some embodiments as illustrated in FIG. 6, map 50c further includes a specification of an inter-entity relation, said specification characterized by attributes such as a type of relation (e.g., writes, drops, reads, sets, loads, executes, etc.) and an indicator of a direction of each respective relation.

FIGS. 7-10 and 12 show exemplary sequences of steps performed by entity map manager 38 to carry out various kinds of entity map management operations according to some embodiments of the present invention. Map management operations such as creating, updating, and deleting entity maps generally occur in response to various computing events detected by the event processing infrastructure described above in relation to FIG. 3. In a step 102 (FIG. 7), map manager module 38 may listen for event notifications from event dispatcher 36. When the current event falls into the map update trigger category (a step 104 returns a YES), in a step 106 may selectively carry out a map update according to a type of the respective event. FIGS. 8-12 illustrate several such exemplary situations.

Figure 8:
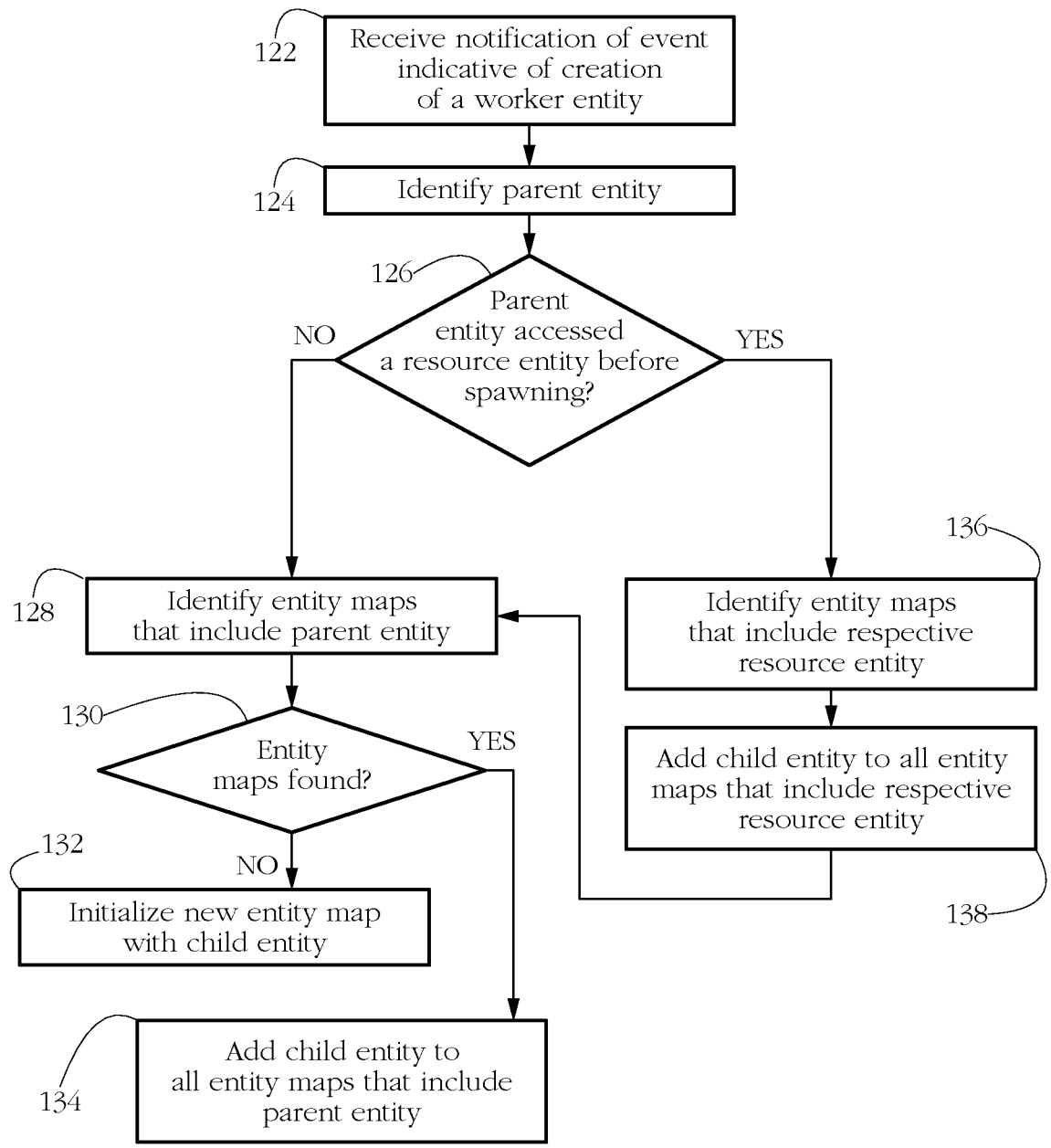
FIG. 8 shows another exemplary sequence of steps performed by the entity map manager according to some embodiments of the present invention.

FIG. 8 shows an exemplary map update procedure performed in response to an occurrence of an event indicative of a creation of a worker entity/process. A new worker entity is created, for instance, when a user double clicks on an executable file, or when a parent entity spawns a child through forking, etc. A step 122 receives notification of the respective event. A further step 124 may analyze the detected event to identify a parent entity causing the creation of the new worker. In a step 126, some embodiments may determine whether the identified parent entity has accessed a resource entity such as an OS registry key or a disk file prior to creating the current worker. Such access may indicate a potential participation of the respective parent entity in a malicious chain of actions. Step 126 may comprise, for instance, parsing a set of security flags associated with the parent entity (see e.g., flag 56a in FIG. 6).

When step 126 returns a NO, in a step 128 manager 38 may identify all available entity maps that include the respective parent entity, including live (in-memory) entity maps as well as persistently stored entity maps. Some embodiments rely on the observation that stored entity maps may describe worker entities that are no longer executing and hence may differ from the identified parent entity at least in some characteristics such as a process ID, among others. Therefore, when searching map repository 26, manager 38 may look for entity maps that include entities matching at least some of the characteristics of the identified parent entity. Some embodiments may require an exact match of selected attributes, such as an entity type, a version/build, and a location of an executable file, while not requiring an exact match of other attributes such as a security flag, among others.

When no entity maps have entities matching the attributes of the identified parent entity (a step 130 returns a NO), in a step 132 manager 38 may initialize a new entity map and add the newly created worker entity to it. Step 132 may include creating a data object (or specification) describing the new worker entity, determining a set of attribute values characterizing the respective entity and populating the created data object the respective attribute values. For exemplary attributes of a worker entity, please see above in relation to FIG. 6.

If step 128 has identified at least one existing entity map having a member entity matching the identified parent entity (step 130 returns a YES), in a step 134, map manager 38 may add the newly created worker entity to each such entity map. Step 134 may comprise adding data (e.g., attribute values) characterizing the new worker entity, as well as data characterizing a relation between the new worker entity and the identified parent entity, to the specification of each entity map identified in step 128.

In some embodiments, when step 126 returns a YES, a step 136 may identify all entity maps that include the resource entity previously accessed by the parent entity identified in step 124. Step 136 may comprise searching live entity maps as well as persistently stored entity maps. As described above, searching may involve looking for entity maps that include resource entities that match at least some selected attributes of the entity identified in step 126. Some embodiments may require an exact match of attributes such as a location of the respective resource, while not requiring exact matches of other attributes such as a security flag, among others. A further step 138 may add the newly created worker entity to all entity maps identified in step 134. As such, step 138 may comprise adding a specification of the new worker entity, as well as a specification of a relation connecting the new worker entity to the respective resource entity. The relation specification may indicate that the respective worker entity was connected to the resource entity because of an existing relation between the respective resource entity and a parent entity of the new worker entity. In carrying out step 138, some embodiments rely on the observation that situations as described here, wherein a parent spawns a child in response to reading or writing a specific registry key, may enable various malicious maneuvers such as privilege escalation and dissimulation of persistent malware, and are therefore informative from the perspective of computer security. By adding the child entity to an entity map in response to an action of its parent entity, some embodiments therefore mark the respective child entity as suspect, or as a potential participant in a more elaborate kill chain.

Figure 9:
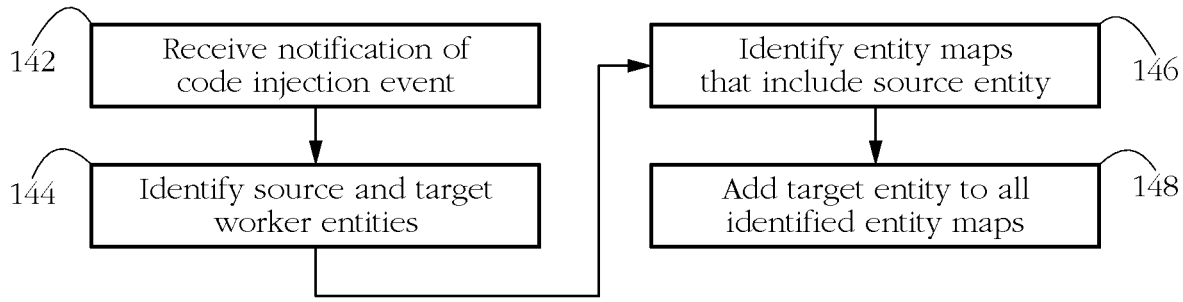
FIG. 9 shows another exemplary sequence of steps performed by the entity map manager according to some embodiments of the present invention.

FIG. 9 shows an exemplary sequence of steps performed by map manager 38 in response to an event indicative of code injection. A step 142 receives notification of the respective event via the event dispatch infrastructure. In a further step 144, manager 38 may analyze the respective event to determine a source entity performing the code injection and a target entity receiving the respective injected code. A sequence of steps 146-148 may then identify all entity maps that include worker entities matching the source entity, and adding the target entity to all such identified entity maps. Step 148 may comprise formulating a specification of the target entity and a specification of a code injection relation connecting the target entity to the source entity, and adding the respective specifications to a data object describing the respective entity map. Exemplary entity and relation specifications are shown for instance in FIG. 6.

Figure 10:
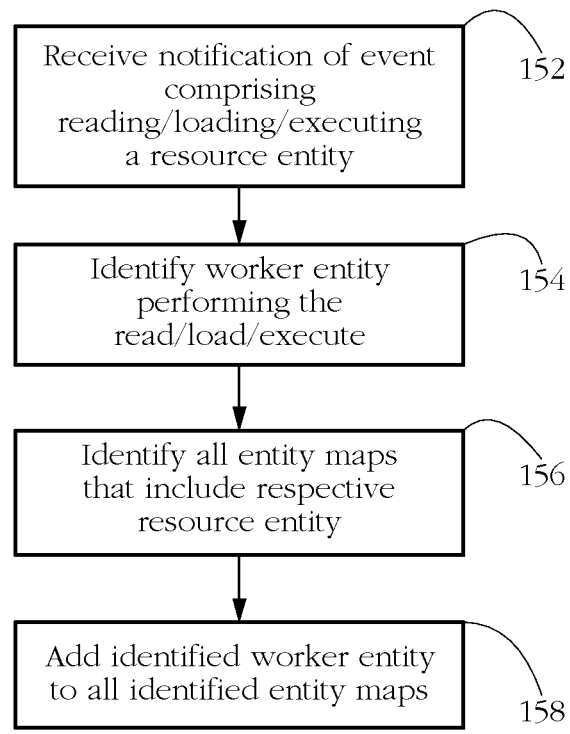
FIG. 10 shows yet another exemplary sequence of steps performed by the entity map manager according to some embodiments of the present invention.

FIG. 10 shows an exemplary sequence of steps carried out by map manager 38 in response to an event indicating accessing a resource entity (e.g., file, OS registry key, etc.), wherein accessing herein encompasses reading, loading, and executing a content of the respective entity. In a step 152, manager 38 is notified of the occurrence of the event. A further step 154 analyzes the detected event to determine an identity of a worker entity attempting to access the respective resource entity. A step 156 performs a lookup to identify all entity maps (live and persistently stored) that include the respective resource entity. In a step 158 map manager 38 then adds the worker entity identified in step 154 to all entity maps identified in step 156. Adding the worker entity may comprise determining a specification of the respective worker entity and of a relation between the respective worker and resource entities, and adding the specification to the identified entity map.

In some situations, the respective resource entity forms a part of a persistently stored entity map, wherein at least some of the members of the entity group described by the respective entity map are no longer alive. In the example illustrated in FIG. 5-B and described above, library 52$n$ was written to disk (and hence added to the respective entity map) during a previous computing session separated by a reboot of the respective client device from the subsequent access by worker entity 52$q$. Stated otherwise, at the moment entity 52$q$ attempts to load entity 52$n$, both worker entities 52$k$-$m$ have been terminated. In such cases, in response to identifying the stored entity map, some embodiments of map manager 38 may revive the stored entity map by instantiating a new, live entity map and populating it with the content of the stored entity map. The worker entity attempting to access the respective resource entity may then be added to the revived entity map. In some embodiments, map manager 38 may mark the already terminated worker entities of the respective map using a dedicated attribute, flag, etc.

Figure 11:
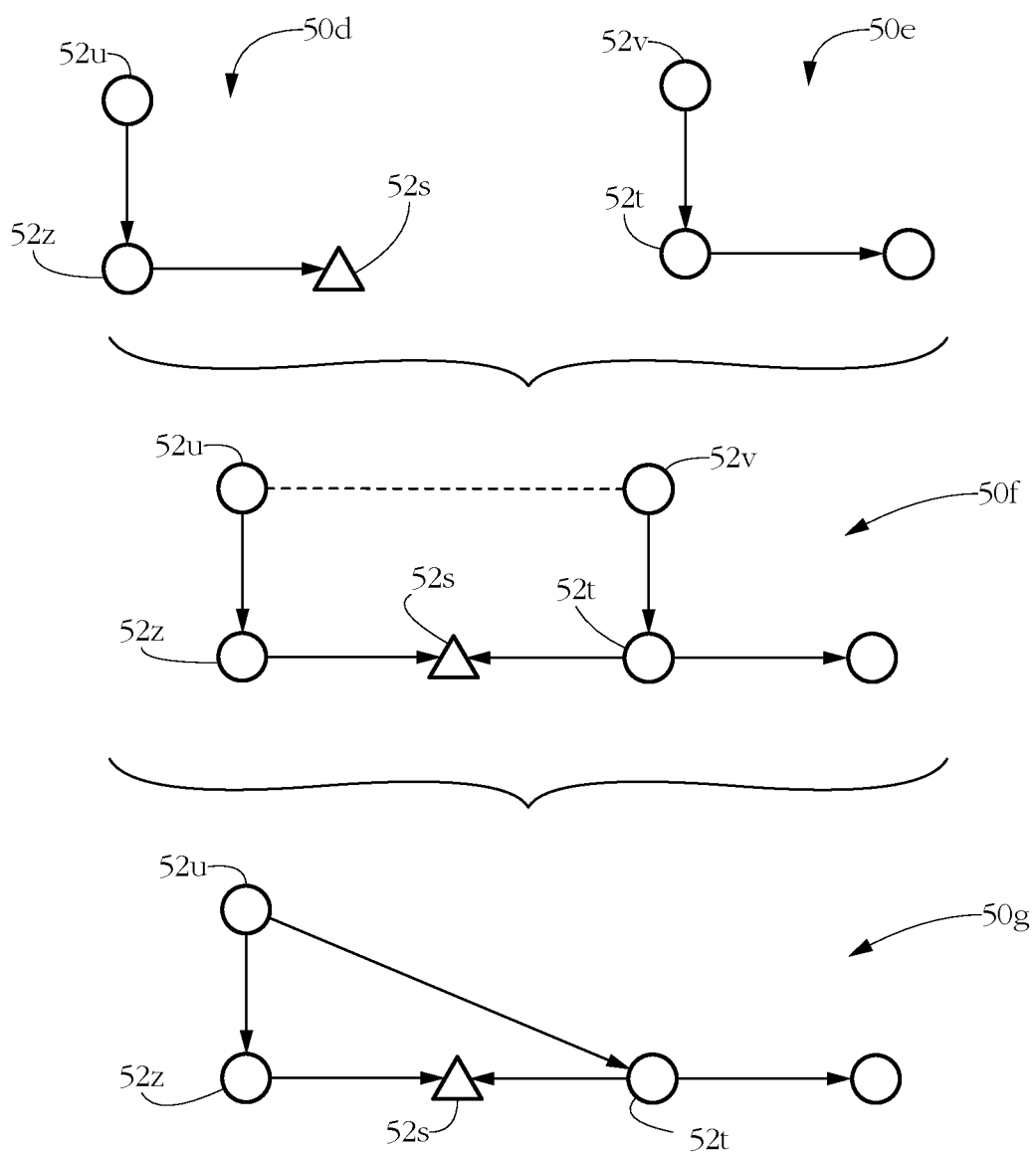
FIG. 11 illustrates an exemplary merging of two entity maps according to some embodiments of the present invention.

There may also exist situations wherein the worker entity attempting to access the respective resource entity is already included in at least one other entity map managed by map manager 38. In such cases, some embodiments merge the entity map that includes the resource entity with the other entity map that includes the worker entity identified in step 154. FIG. 11 illustrates an exemplary merging of a pair of exemplary entity maps 50$d$-$e$ into an aggregate entity map 50$f$. The illustrated merge may occur in response to an attempt by worker entity 52$t$ of entity map 50$e$ to access a content of resource entity 52$s$ of entity map 52$d$. Merging two entity maps may comprise, for instance, copying a content of a first entity map into a second entity map, adding a specification of an edge/link, and deleting the first entity map.

In some embodiments, merging two entity maps further comprises re-arranging and/or simplifying an aggregate entity map to remove redundant information. In the example of FIG. 11, entity map 50$f$ is further processed to produce simplified entity map 50$g$, following a determination that worker entities 52$u$-$v$ have the same characteristics and that the relation between entities 52$u$-$z$ is of the same type as the relation between entities 52$v$-$t$.

Figure 12:
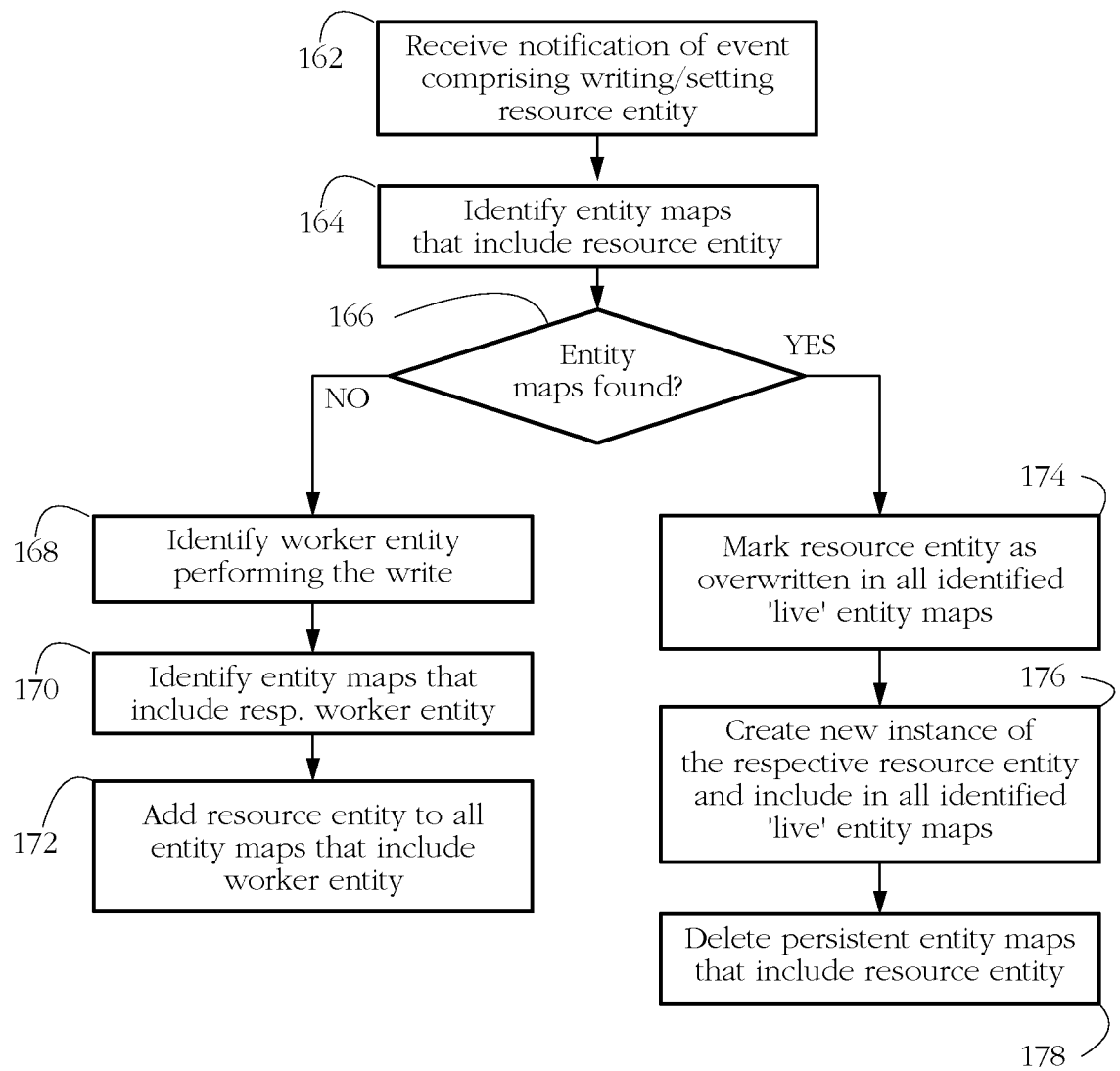
FIG. 12 shows another exemplary sequence of steps performed by the entity map manager according to some embodiments of the present invention.

FIG. 12 shows an exemplary sequence of steps performed by entity map manager 38 in response to an event indicative of an attempt to create or overwrite a resource entity (e.g., file, OS registry key). A step 162 receives a notification of the respective event from event dispatcher 36. In a further step 164, manager 38 may process the event notification to identify the resource entity currently being written/modified. Step 164 further identifies all entity maps (live and persistently stored) that include the respective resource entity, i.e., all maps that include resource entities matching the characteristics of the respective resource entity. When such entity maps do not exist (a step 166 returns a NO), indicating that the current resource entity is just being dropped/created/set, a step 168 identifies the worker entity attempting the current write operation. A step 170 may identify all entity maps that include entities matching the characteristics of the identified worker entity. A further step 172 may then add the respective resource entity to all entity maps identified in step 170. Adding the resource entity may herein comprise formulating a specification of the resource entity and a specification of a relation between the identified worker entity and the resource entity, and adding the respective specifications to each identified entity map.

When step 166 returns a YES, indicating that the respective resource entity is currently being overwritten/reset, in a step 174 some embodiments of manager 38 modify live entity maps identified in step 170 to indicate that the respective entity has been overwritten. Such modifications may include changing a value of a security flag characterizing the respective resource entity (see e.g., flags 56$b$ in FIG. 6).

A step 176 may add a new instance of the respective resource entity to all live entity maps identified in step 164. A security flag associated with the new instance may then be set to indicate that the respective instance of the resource entity has not yet been overwritten or reset. Steps 174-176 ensure that information about obsolete resource entities that might have been used in the past to transfer malicious data between members of the respective entity map is saved at least as long as there exists at least one live worker entity that can exploit such data.

In some embodiments, in a further step 178, manager 38 may delete all persistently stored entity maps that include the respective entity, based on the observation that when a resource entity is overwritten or reset, any malicious payload carried by the respective entity is likely lost and therefore cannot contaminate any future worker entities. In alternative embodiments, step 178 may remove the respective resource entity from all persistently stored entity maps.

Beside exemplary methods of managing entity maps as illustrated in FIGS. 7-12, some embodiments of map manager 38 may implement a memory and resource management policy that affects how many entity maps are permanently stored in repository 26 and how long they are kept on storage media of the respective client device. Some embodiments limit the bit size and/or count of records stored within map repository 26 to a predetermined upper threshold. New records (e.g., entity maps) may be freely added to repository 26 until the limit is reached, and some records may be deleted afterwards to maintain the storage quota. Various map removal strategies may be implemented. For instance, each entity stored in repository 26 may have an associated priority indicator; lower priority entries are then removed before higher priority entries. In another example, each entity stored in map repository 26 may have an associated timestamp indicating a moment in time when the respective entity map was last accessed. Manager 38 may then decide which maps are deleted according to the respective timestamp(s). For instance, entity maps which were not accessed for a time period exceeding a pre-determined threshold may be automatically deleted. In another exemplary strategy, rarely accessed entity maps may be deleted before other, more frequently accessed entity maps.

Figure 7:
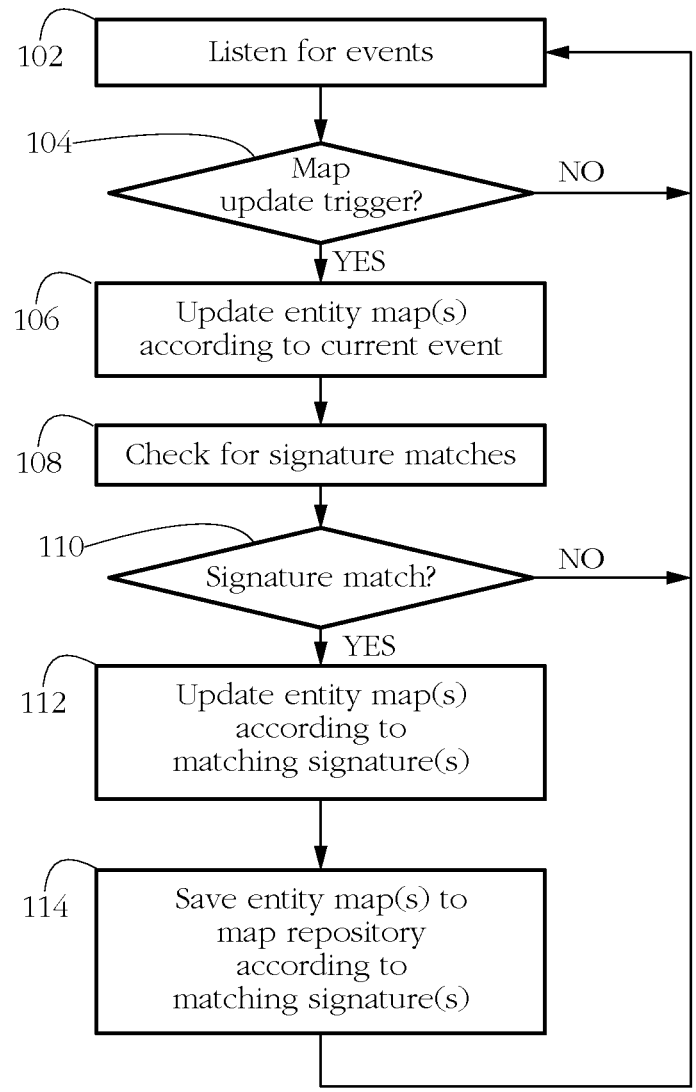
FIG. 7 shows an exemplary sequence of steps performed by an entity map manager module according to some embodiments of the present invention.
Figure 13:
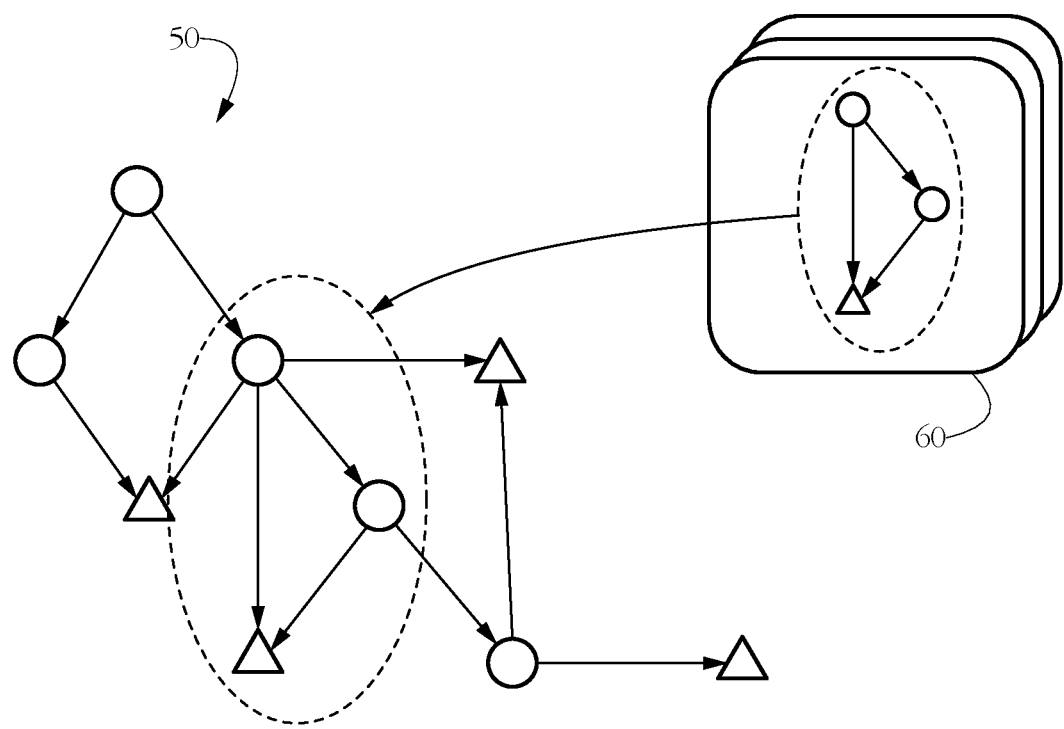
FIG. 13 illustrates an exemplary entity map signature match according to some embodiments of the present invention.

Going back to FIG. 7, in response to updating any relevant entity maps as detailed above, in a step 108 manager 38 may check the updated entity maps for signature matches. Some embodiments store a collection of security signatures in map repository 26 and/or other non-transitory computer-readable media communicatively coupled to the respective client device. FIG. 13 illustrates an exemplary security signature 60, as well as a signature match according to some embodiments of the present invention.

Signature 60 comprises a signature map and an indicator of an action to be performed in response to a match. A signature map herein comprises a description of a plurality of inter-related entities including worker and/or resource entities, for instance in the form of a graph as illustrated in FIG. 13. Signature maps typically include relatively small groups of entities inter-related in a manner which is relevant for computer security. One example comprises an instance of Microsoft Outlook® saving a file received as an email attachment. Such a signature map may include a worker entity having characteristics of an Outlook® instance and connected to a resource entity of a file type.

As shown above in relation to entity maps managed by map manager 38, various computer-readable encodings may be used to specify security signatures. FIG. 14 shows such an exemplary encoding according to some embodiments of the present invention. Exemplary signature 60a comprises a section specifying each entity of the respective signature map and a section specifying each pairwise relation among entities. Entities and relations may be specified by a set of attribute-value pairs or any other data format known in the art. In some embodiments, a selected worker entity of the signature map is designated as a root node 63 of the respective signature; such designation may facilitate signature matching, by selecting a starting point in a signature matching procedure.

In some embodiments, checking whether a security signature matches a target entity map comprises determining whether the respective target entity map includes the respective signature map, i.e., whether the signature map is a subgraph of the target entity map. Stated otherwise, a target entity map may match a signature if each entity of the signature map has a matching counterpart within the target entity map (i.e., an entity having the characteristics described in the respective security signature), and further if the matching counterpart entities are mutually related in the manner of the respective signature map. In the example of FIG. 13, target entity map 50 matches signature 60.

In some embodiments as illustrated in FIG. 14, entity specifications of signature 60a include a set of predicates 62 involving various entity attributes such as entity type, version, location, timestamp, security flags, etc. Signature matching may then include evaluating the respective predicates according to attribute values of members of the target entity map. In one such example illustrated in FIG. 14, determining whether a target entity map matches signature 60a may comprise searching the target entity map for a worker entity whose value of the "ExecutablePath" attribute contains the string "Outlook.exe". Other exemplary predicates may include other string operators (e.g., "BeginsWith"), regular expressions, Boolean operators, and various mathematical operators (e.g., <, >, various hash functions, etc.).

A signature match may require that all signature predicates evaluate to TRUE. Alternative embodiments may allow partial or fuzzy matches, for instance, determine that a signature matches a target entity map when at least 80% of the predicates recited in the respective signature evaluate to TRUE.

Signature matching may proceed according to any graph processing algorithm known in the art. For instance, some embodiments may search the target entity map for subgraphs that are isomorphic to the signature map. (In the example illustrated in FIG. 13, the emphasized subgraph of target entity map 50 is isomorphic to the signature map of signature 60.)

In some embodiments, signature matching may proceed in parallel to the map update process, for instance in response to specific map update trigger events. In one such example, map manager 38 may maintain a partial match roster comprising a database associating monitored software entities with signatures 60 that include nodes matching the characteristics of the respective entities. Signatures 60 listed in the roster thus partially match at least one current entity map, since their respective signature maps include at least one entity having a matching counterpart within the respective entity map. In some embodiments, the partial match roster associates software entities with signatures whose root node matches the respective entities (see root node 63 of exemplary signature 60a, FIG. 14). The data format and specification of the partial match roster may vary according to implementation. An exemplary roster entry may comprise a tuple $\{E, M, S, \delta\}$, wherein E comprises an identifier of a currently monitored entity, M identifies an entity map having entity E as a node, S identifies a security signature whose root node matches the characteristics of entity E, and $\delta$ represents an indicator of an extent or degree to which signature S matches entity map M. An exemplary match extent indicator may comprise a number that varies between a lower bound (e.g., 0=no match) and an upper bound (e.g., 1=complete match), and wherein a value between 0 and 1 may indicate that only a part or subgraph of signature S currently matches map M. In some embodiments, $\delta$ may be expressed as another tuple $\delta=\{e_1, \ldots, e_m, r_1, \ldots, r_n\}$, wherein $e_1, \ldots, e_m$ and $r_1, \ldots, r_n$ respectively identify entities/nodes and relations/edges of signature S that are currently matched in map M. Assuming for instance that S represents the signature illustrated in FIG. 14, $e_1$ may denote entity "Worker1", while $r_1$ may denote the relation between entities "Worker1" and "Resource1". Roster entries as illustrated above may be selectively retrieved according to various criteria such as an identifier of an entity, map, signature, etc. In some embodiments, there may be multiple roster entries associated with the same entity E, each roster entry identifying a distinct partially matching signature 60.

Figure 15:
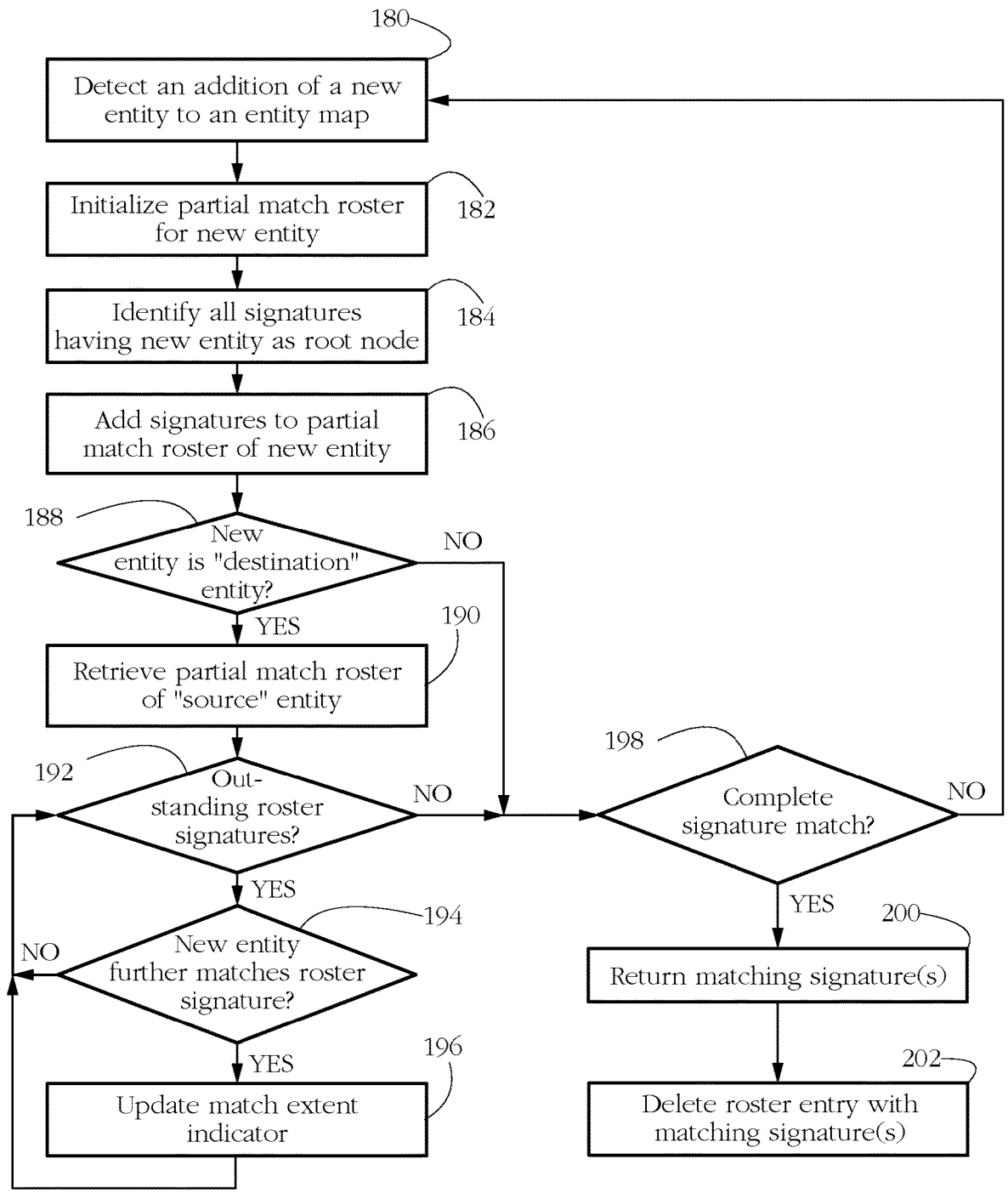
FIG. 15 shows an exemplary sequence of steps performed by the entity map manager to check for map signature matches according to some embodiments of the present invention.

An exemplary signature matching procedure is illustrated in FIG. 15. In a step 180, map manager 38 may detect an addition of a new entity to an entity map. Such additions may occur in various situations, as described above in relation to FIGS. 8-12. In a step 182, map manager 38 may initialize a new partial match roster entry for the new entity. Further steps 184-186 populate the new roster entry by identifying entity maps 50 that include the new entity and security signatures 60 whose root node matches the new entity. Some embodiments may set an initial value of $\delta$ indicating that the identified signatures match the identified entity maps only at the root node.

A further step 188 may determine whether the new entity is a "destination" node of the respective entity map, i.e., whether the respective entity map has any edges pointing to the new entity. Exemplary destination nodes include child entities and entities having received injected code from other entities. When step 188 returns a YES, a step 190 may identify a "source" entity connected to the new entity within the respective entity map. Exemplary source entities include a parent entity and a code injector entity, among others. In step 190, map manager 38 further retrieves partial match roster entries associated with the respective source entity.

A sequence of steps 192-194-196 may then cycle through all roster entries of the source entity (i.e., all signatures whose root node matches the source entity). A step 194 determines whether the new entity further matches the respective signature, i.e., whether the respective signature map has a candidate node matching the characteristics of the new entity, and whether the candidate node is connected to the root node by the same type of relation as the one connecting the new entity and the source entity within the respective entity map. When the new entity indeed extends the match between the current entity map and the respective signature (step 194 returns a YES), step 196 increments match extent indicator δ accordingly.

In some embodiments, the cycle of steps 192-194-196 may be repeated recursively, progressively moving upward through the current entity map from the current source entity to a source entity of the current source entity, etc., until all the lineage of the newly added entity has been explored. Using the exemplary entity map illustrated in FIG. 5-A and assuming that step 180 has detected the addition of worker entity 52g, steps 192-194-196 may be performed for source entity 52d, then repeated for source entities 52c and 52a. At every such level within the entity map, map manager 38 may determine whether the newly added entity (i.e., worker entity 52g) extends the match of a selected security signature, as indicated by a set of partial match roster entries associated with the current source entity.

When all relevant roster entities have been analyzed (step 192 returns a NO), in a step 198 map manager 38 may determine whether any signature 60 completely matches the current entity map, for instance by looking up roster δ values. When yes, a step 200 may return an identifier of a matching signature. In some embodiments, a further step 202 may free computing resources by deleting any roster entries associated with a completely matching signature.

When a signature match is detected (a step 110 in FIG. 7 returns a YES), in a step 112 map manager 38 may perform a set of actions according to the respective matching signature(s). In some embodiments as illustrated in FIG. 14, signature specifications may include an action-indicative section 64 indicating actions to be taken in response to a signature match. Such actions may be targeted at specific entities and/or inter-entity relations. Exemplary actions include modifying an entity map matching the respective signature by updating a specification of an entity and/or a specification of a relation between two members of the respective entity map. In one such example illustrated in FIG. 14, action-indicative section 64 instructs map manager 38 to set a security flag to indicate that a respective resource entity has external origins (i.e., was downloaded from the Internet). Other exemplary actions executed in response to a signature match may include, among others, determining that a specific member of an entity group (and/or the whole entity group) is malicious, and activating or de-activating a specific detection model 42, as described below.

In some embodiments as illustrated by section 64 of signature 60a (FIG. 14), yet another type of action performed in response to a signature match comprises persistently storing an entity map that matches the respective signature (a step 114 in FIG. 7). For instance, map manager 38 may save all entity maps matching the respective signature to map repository 26 stored on a non-volatile medium such as a hard drive communicatively coupled to the respective client device. Section 64 may further indicate various storage parameters, such as a storage location, duration, and priority of the respective entity map.

In step 114, some embodiments of map manager 38 further collaborate with detection engine 40 to persistently save a set of current malware-indicative scores such as a group score and/or individual entity scores. Such scores are described in detail below. Scores may be attached as metadata to the respective entity map, together with a timestamp indicating a time when the respective map and scores were saved.

Persistently storing selected entity maps may facilitate detection of persistent malware. Taking the example of FIG. 5-B, a security signature may describe an instance of Windows Internet Explorer® dropping an executable library to a local disk. The respective signature may instruct map manager 38 to persistently store any entity map including the respective types of entities and relations. When map manager 38 detects that a live entity map matches the respective signature (e.g., a map connecting entity 52m to entity 52n as illustrated in FIG. 5-B), it may then save the respective map to persistent storage. The respective entity map may then be recovered in response to a reboot, thus preserving a malicious chain of actions.

In some embodiments, detection engine 40 maintains a data structure tracking the behavior of various software objects executing on the respective client device. Such tracking may be carried out via a system of malware-indicative scores which are dynamically updated according to the behavior of the respective monitored software. A decision on whether the respective client device comprises malware may then be taken by comparing a score to a pre-determined threshold. Threshold values may vary according to user preference, security policy, subscription, or service-level agreement, among others.

In one exemplary embodiment, a first set of scores comprises individual entity scores, each entity score associated with an individual worker entity currently or previously executing on the respective client and indicative of whether the respective entity is malicious. A second set of scores may comprise collective group scores, each such group score associated with an entity group identified by map manager 38 and indicative of whether the respective whole group of entities is malicious. A group score may change according to an action of an individual member of the respective group, and therefore such scores facilitate detection of sophisticated malware wherein malicious activities are divided among group members. In some embodiments, each group score is uniquely associated with an entity map identifying a respective group of inter-related entities as described above. To accurately manage entity and group scores, detection engine 40 may receive information such as current group composition from entity map manager 38 (see FIG. 3).

In some embodiments, each worker entity and/or entity group is monitored and assessed for malice using an entity-specific or group-specific set of detection models 42. Models 42 may be selected for instance according to entity type (e.g., some models 42 may apply exclusively to instances of Microsoft Word®, while others may apply indiscriminately to all executables). In a simple example wherein detection models 42 represent individual malware heuristics, each entity may be monitored using an entity-specific subset of heuristics. Monitoring may comprise applying a detection model to the respective entity, e.g., determining whether a particular set of conditions is satisfied by the respective entity, whether the respective entity has carried out a particular action, etc. Some detection models 42 are configured to output a score increment, for instance 1 when the respective model indicates that a respective entity is malicious and 0 otherwise. Detection engine 40 may then increment an entity score and/or a group score according to the output of models 42.

In some embodiments, a score increment determined by selected detection models 42 may vary according to various characteristics of the respective entity. For instance, the action of accessing a user file may produce one score increment if the worker entity comprises verified code, and another, relatively larger score increment otherwise. Furthermore, the output of some detection models may vary during the lifetime of a monitored entity, as various characteristics of the respective entity change in time. Using the example above, the score increment may change in response to the respective entity's receiving injected code or loading a specific resource entity.

In some embodiments, the choice of detection models 42 assigned to each entity/group may change in time, for instance in response to an action of the respective entity and/or in response to selected changes in the characteristics of the respective entity. Stated otherwise, engine 40 may start monitoring an entity using a first set of detection models 42 and later switch to using other detection models 42 for the same entity. The switch may be caused, for instance, by a change in the value of a selected security flag within an entity map that includes the respective monitored entity, as shown in more detail below.

Figure 16:
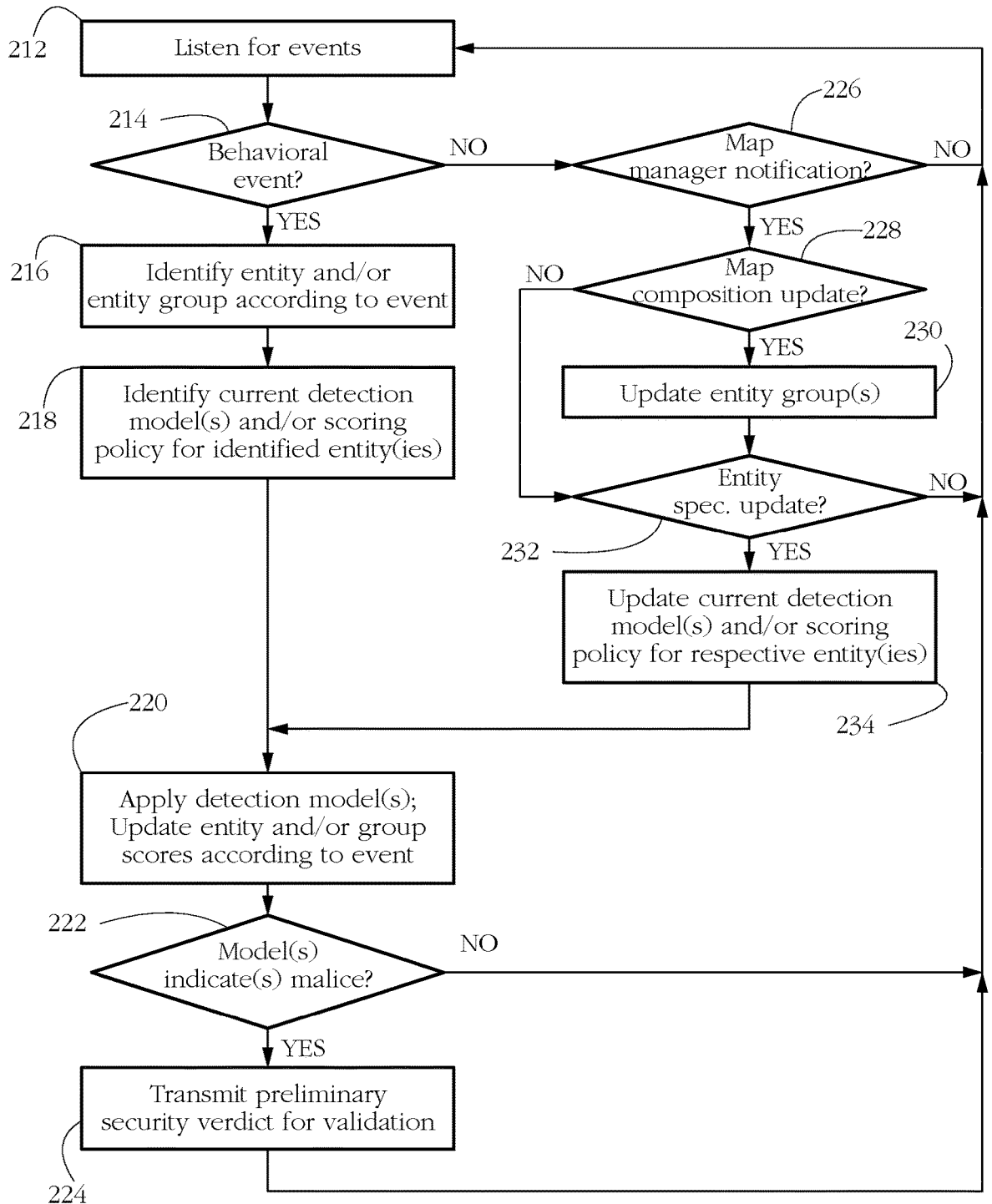
FIG. 16 illustrates an exemplary sequence of steps performed by a detection engine according to some embodiments of the present invention.

FIG. 16 shows an exemplary sequence of steps performed by detection engine 40 in some embodiments of the present invention. A step 212 may listen for events via the event processing infrastructure described above in relation to FIG. 3. A step 214 analyzes the respective notification to determine whether it is behavior-indicative, e.g., whether it indicates an action such as opening a file, accessing a URL, etc. When yes, a step 216 identifies an entity causing the respective event. Some embodiments further use current entity map information maintained by map manager 38 to identify a set of entity groups/maps that include the identified entity.

In a further sequence of steps 218-220, engine 40 may identify detection models 42 currently assigned to the entity and/or entity group(s) identified in step 216, and applies the respective detection models. Step 220 may comprise for instance evaluating a set of heuristics/rules, calculating a set of inputs, feeding them to an artificial neural network and carrying out the respective neural calculations, etc. In some embodiments, the output of each model 42 comprises a score and/or a score increment determined according to the respective event. In such cases, step 220 may further include updating malware-indicative scores of the entity and/or entity group(s) identified in step 216.

A further step 222 may determine whether the current scores corresponding to the entity and/or group(s) indicate that the client device comprises malware, for instance by comparing each of the respective scores to a threshold. In some embodiments, the respective client is deemed malicious/infected when at least one malware-indicative score exceeds a respective threshold. When step 222 returns a YES, some embodiments transmit a preliminary security verdict to a validation module 46 (FIG. 3). In turn, module 46 may carry out additional assessments, which may include communicating the verdict and/or other security-relevant data to security server 14. Validation module 46 may then output a consolidated security verdict 56 indicating whether the respective client device is malicious. Verdict 56 may be displayed or otherwise communicated to a user, system administrator, etc.

Detection engine 40 may also receive notifications from map manager 38 concerning changes in the composition of various entity groups and/or changes in the specification/attributes of various entities (e.g., setting of security flags, etc.). When a step 226 identifies such a notification, a further step 228 determines whether there are entity map updates. When yes, in a further step 230, engine 40 may update its scoring objects according to changes in the current entity maps. When a new entity is created and added to an existing entity map/group, some embodiments may initialize a new entity score for the respective entity, and further associate the new entity with its respective group so that the respective group score may be updated in response to further activities of the new entity. Similarly, in response to the creation of a new entity group/map, engine 40 may initialize a new group score and associate it with the newly created entity group. In some embodiments, when an entity map is recovered from persistent storage in response to a system reboot, the recovered entity map further includes a set of scores calculated for the respective entity group and/or individual entities in a previous computing session. In such situations, some embodiment may update current scores according to the recovered scores.

In response to changes in the attributes of an individual entity (when a step 232 returns a YES), in a further step 234 engine 40 may determine whether such changes warrant any changes in the detection policy for the respective entity and/or group. For instance, step 234 may cause a switch from using some detection models to using other detection models. In some embodiments, step 234 may comprise evaluating a set of model-specific activation predicates and activating the respective model 42 if the respective predicates evaluate to TRUE. One example of a model activation predicate comprises determining whether a particular security flag of the respective entity is currently set (see exemplary security flags 56a-b in FIG. 6). Detection models 42 may be similarly de-activated/switched off, for instance by evaluating a set of de-activation predicates.

In some embodiments, step 234 comprises changing various parameters of current detection models 42 in response to changes in the characteristics of a monitored entity. For instance, a value of the output of the respective model (e.g., score increment) may change in response to a reset of a security flag.

Figure 17:
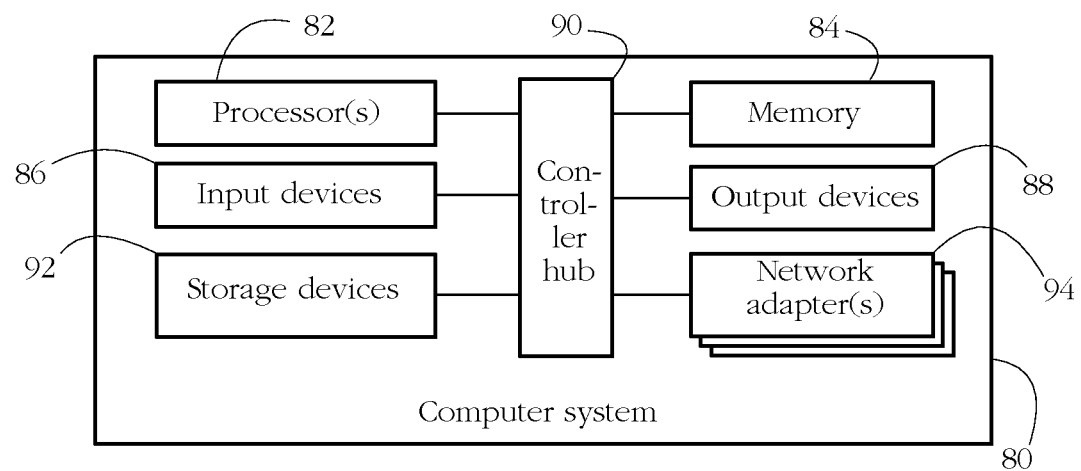
FIG. 17 shows an exemplary hardware configuration of a computer system programmed to execute some of the methods described herein.

FIG. 17 shows an exemplary hardware configuration of a computer system 80 programmed to execute some of the methods described herein. Computer system 80 generically represents any client device 12a-d in FIG. 1. The illustrated computing appliance is a personal computer; other devices such as servers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g. network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable an efficient detection of sophisticated malicious software, and are particularly directed at malware that attempts to evade detection by dividing its malicious activities among multiple entities and/or over multiple computing sessions. Some advanced malware can persist on a respective machine and survive multiple reboot events. In one such example illustrated in FIG. 5-B, an instance of a legitimate program (e.g., a Microsoft OneDrive® client) becomes a transmission vector for malware in response to loading a malicious library dropped on a local disk by another legitimate program in a previous computing session. In the respective example, the reboot event effectively breaks the sequence of malicious activities, also known in the art as a kill chain. Conventional security solutions typically analyze only data derived from a current computing session, e.g., only monitor currently executing software entities and are therefore unaware of at least a part of the kill chain.

In contrast to such conventional anti-malware systems, some embodiments of the present invention preserve structured security information persistently, thus enabling security software to recover and collate such historical security data across multiple computing sessions. In some embodiments, an entity map manager constructs and maintains a set of entity maps, each entity map describing a distinct group of inter-related software entities. An exemplary entity map comprises a directed graph connecting members of the respective entity group. Such an entity group may comprise worker entities such as processes and resource entities such as files and OS registry keys, among others. Worker entities may be related by filiation (parent-child) and code injection, among others. A worker entity is related to a resource entity when the respective worker entity accesses (reads, writes, sets, etc.) the respective resource entity.

Entity maps may be saved in persistent storage, for instance in a map repository/database stored on non-volatile computer readable media connected to the respective computing device. Some embodiments rely on the observation that sophisticated malware may use persistent assets such as files and registry keys to survive a reboot. Embodiments of the present invention therefore preserve and use information about such persistent assets. However, preserving structured security information in the form an entity map goes substantially beyond simply identifying potentially malicious persistent assets. In response to detecting an attempt to access a file or a specific OS registry key, some embodiments parse the stored map repository to determine whether the respective asset appears in any stored entity map, and when yes, the stored map is merged with a current entity map that includes the entity attempting the access. Some embodiments are thus able to reconstitute and fully characterize an entire kill chain spanning multiple computing sessions.

Some embodiments persistently store only a selected subset of entity maps, for instance maps that include known fragments of kill chains, worker entities known for acting as vectors for transmitting malware, and specific resource entities such as selected OS registry keys which are typically used in an attack. To efficiently select entity maps for persistent storage, some embodiments assemble a collection of security signatures and determine whether a current entity map matches any of the signatures in the collection. A security signature may itself include a description of a signature entity map. Such signature map may describe documented attack strategies such as sequences of actions and types of entities used in privilege escalation, ransomware attacks, and data exfiltration attacks, among others. Such signatures may be defined by computer security professionals and distributed to client computers as software updates or as part of a security subscription. Determining whether a target entity map matches a signature may include, for instance, determine whether the target entity map includes the signature entity map as a subgraph.

In some embodiments, a security signature may further include an indicator of an action to be taken in response to a match between the respective signature and a current entity map. Exemplary actions comprise, among others, determining that the respective client computer is infected with malware, and setting a security flag associated with a selected entity of the target entity map. Such security flags may influence an evaluation of the selected entity or of the entire respective entity group, based on an observation that a signature match may indicate a suspicion of malice.

In some embodiments, a detection engine computes a set of dynamic malware-indicative scores. Some scores may be attached to individual entities, while others may be attached to a whole entity group as identified by an entity map as described above. A score may change according to the behavior of a respective software entity. Actions of an individual entity may also affect a group score, thus allowing an effective detection of distributed malware.

The detection engine may selectively apply a set of detection models to determine malware-indicative scores. The choice of model may depend on a type of entity, a type of malware, etc. The choice of model may be further affected by the behavior of a respective entity and/or by whether an entity map matches a particular security signature. In one such example, the entity map manager may set a security flag when an entity map matches a selected signature. Setting of the respective flag may be interpreted by the detection engine as a trigger for switching from one detection model to another. In one such example, the detection engine may use a default detection model comprising a compact, minimal set of heuristics to assess a currently monitored group of entities. The detection engine may then switch to a more computationally expensive detection model in response to an activation of a security flag attached to the respective entity group. The respective flag may be set by the entity map manager in response to a signature match, as described above. By dynamically adapting the detection criteria to the current behavior, as well as to the previous history of an entity group, some embodiments of the present invention manage an efficient detection of malware with minimal computational costs.

A specific example of malware targeted by some embodiments of the present invention comprises a recently discovered exploit of the OS print spooler service, which allows an attacker to run arbitrary code in the context of the spooler, even remotely (from another machine). In some client devices and operating systems, the print spooler loads a set of configuration data such as a printer driver from a set of local libraries. The respective configuration data prepares the spooler for executing a particular print job, and may be printer-specific, user-specific, and/or job-specific. A malicious actor can exploit this mechanism by deliberately crafting the respective library to include malicious code, or by surreptitiously inserting the respective code into a library that is currently in use. Loading a malicious DLL then causes the spooler service to act as a vector for infection. Conventional security software that just monitors the behavior of the spooler may struggle to detect such attacks. In contrast, some embodiments of the present invention may maintain an entity map including worker entities from the spooler service and further including the configuration DLL as a resource entity. The map manager may then monitor attempts to access the configuration DLL, thus detecting any suspicious modifications by entities other than the spooler service itself. In some embodiments, the use of entity maps thus enables security software to discern between legitimate and potentially illegitimate uses of the same process or service. In turn, the detection engine may use a minimal set of heuristics to monitor the behavior of the print spooler, and switch to a more sophisticated detection model only in response to the map manager's detecting a suspect modification of the configuration library. By flexibly adapting the detection methodology to the current situation, computational costs are minimized without sacrificing performance.

Persistently storing various entity maps may also benefit other aspects of computer security. Some sophisticated attacks such as the recent hack of the SolarWinds® Orion® platform are detected and fully described only much later, for instance several months after the actual attack has taken place. When an attack targets such popular software having a potentially large client base, many clients rightfully want to know whether their own computer systems have been affected and whether any data breach has taken place. However, answering this question retroactively is notoriously difficult because the malicious actors responsible for the respective attack typically try to erase their footprint. By saving historical security data in the form of an entity map, some embodiments enable a thorough forensic investigation of a previous behavior of a computer system. Such investigations may parse a collection of persistently stored entity maps looking for various indicators of compromise (IOC) as soon as such IOCs become available. Some IOCs may then be encoded as security signatures including signature entity maps as described herein.

Persistently storing entity maps and other structured security data further enables a proactive study of attack methods. Some embodiments may collect a variety of entity maps from various client devices and analyze the entity map collection to identify types of attacks specific to each type of device, OS, etc., and/or to identify as yet unknown kill chains, methods of privilege escalation, and methods of concealment, among others.

The use of malware-indicative signatures is known in the art of computer security. Conventional signatures may be static (e.g., known malicious sections of code, malicious patterns of instructions, etc.) or behavioral (e.g., known malicious sequences of actions). However, in conventional anti-malware, a signature match merely works as an indicator of malice. As such, its occurrence is not recorded or in any way re-used later. In contrast, in some embodiments of the present invention, a signature match typically triggers an update of an entity map first, which only indirectly then affects malware scoring and detection. Stated otherwise, some embodiments deliberately store security information related to selected signature matches persistently, for instance in the form of various metadata, security flags, scores, etc., annotating a respective entity map. Persistently storing such data together with the associated entity map allows a substantially richer interpretation and understanding of a potential kill chain encoded within the respective stored entity map.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to execute an entity map manager and a malware detection engine connected to the entity map manager, wherein:
 the entity map manager is configured to construct entity maps specifying groups of inter-related software entities, and further configured to:
  in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and
  update the entity map by adding a specification of the worker entity to the entity map, wherein the entity map further includes a specification of another worker entity having executed on the computer system prior to the reboot and a specification of a relation between the other worker entity and the resource entity; and
 the malware detection engine is configured to determine whether the computer system comprises malicious software according to the updated entity map.

2. The computer system of claim 1, wherein the resource entity is selected from a group consisting of a computer file and an operating system registry key.

3. The computer system of claim 1, wherein the entity map manager is further configured to, in response to another attempt by the worker entity to access another resource entity, add a specification of the other resource entity to the entity map.

4. The computer system of claim 1, wherein the entity map manager is configured to, in response to the attempt by the worker entity to access the resource entity:

identify another entity map according to whether the other entity map includes a specification of the worker entity; and in response, merge the entity map with the other entity map.

5. The computer system of claim 1, wherein the entity map manager is configured to, in response to detecting the creation of a child worker entity by a parent worker entity:
determine whether the parent worker entity has accessed the resource entity; and
in response, if yes, add a specification of the child worker entity and a specification of a relation between the child worker entity and the resource entity to the entity map.

6. The computer system of claim 1, wherein:
the specification of the worker entity comprises a security flag;
the entity map manager is configured to, in response to the attempt by the worker entity to access the resource entity, set the security flag; and
the malware detection engine is configured to select a detection model for determining whether the worker entity is malicious from a plurality of detection models according to a current value of the security flag.

7. The computer system of claim 1, wherein:
the specification of the resource entity comprises a security flag; and
the entity map manager is configured to, in response to an attempt to overwrite a content of the resource entity:
set the security flag,
selectively retrieve from the map repository another entity map according to whether the other entity map includes the specification of the resource entity, and
in response, delete the other entity map.

8. The computer system of claim 7, wherein the entity map manager is further configured to, in response to the attempt to overwrite the content of the resource entity, add another instance of the resource entity to the entity map.

9. The computer system of claim 1, wherein the entity map manager is further configured to save the updated entity map to the map repository.

10. The computer system of claim 1, wherein the malware detection engine is configured to determine whether the computer system comprises malicious software according to a malware-indicative score associated with the entity map and collectively characterizing all members of an entity group identified according to the entity map, wherein the score is determined according to a behavior of at least one member of the entity group.

11. A computer security method comprising employing at least one hardware processor to execute an entity map manager and a malware detection engine connected to the entity map manager, wherein:
the entity map manager is configured to construct entity maps specifying groups of inter-related software entities;
executing the entity map manager comprises employing the at least one hardware processor to:
in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and
update the entity map by adding a specification of the worker entity to the entity map, wherein the entity map further includes a specification of another worker entity having executed on the computer system prior to the reboot and a specification of a relation between the other worker entity and the resource entity; and
executing the malware detection comprises employing the at least one hardware processor to determine whether the computer system comprises malicious software according to the updated entity map.

12. The method of claim 11, wherein the resource entity is selected from a group consisting of a computer file and an operating system registry key.

13. The method of claim 11, wherein executing the entity map manager further comprises, in response to another attempt by the worker entity to access another resource entity, adding a specification of the other resource entity to the entity map.

14. The method of claim 11, wherein executing the entity map manager further comprises, in response to the attempt by the worker entity to access the resource entity:
identifying another entity map according to whether the other entity map includes a specification of the worker entity; and
in response, merging the entity map with the other entity map.

15. The method of claim 11, wherein executing the entity map manager further comprises, in response to detecting the creation of a child worker entity by a parent worker entity:
determining whether the parent worker entity has accessed the resource entity; and
in response, if yes, adding a specification of the child worker entity and a specification of a relation between the child worker entity and the resource entity to the entity map.

16. The method of claim 11, wherein:
the specification of the worker entity comprises a security flag;
executing the entity map manager further comprises, in response to the attempt by the worker entity to access the resource entity, setting the security flag; and
executing the malware detection engine further comprises selecting a detection model for determining whether the worker entity is malicious from a plurality of detection models according to a current value of the security flag.

17. The method of claim 11, wherein:
the specification of the resource entity comprises a security flag; and
executing the entity map manager further comprises, in response to an attempt to overwrite a content of the resource entity:
setting the security flag,
selectively retrieving from the map repository another entity map according to whether the other entity map includes the specification of the resource entity, and
in response, deleting the other entity map.

18. The method of claim 17, wherein executing the entity map manager further comprises, in response to the attempt to overwrite the content of the resource entity, adding another instance of the resource entity to the entity map.

19. The method of claim 11, wherein executing the entity map manager further comprises saving the updated entity map to the map repository.

20. The method of claim 11, wherein executing the malware detection engine comprises determining whether the computer system comprises malicious software according to a malware-indicative score associated with the entity map and collectively characterizing all members of an entity group identified according to the entity map, wherein the score is determined according to a behavior of at least one member of the entity group.

21. A non-transitory computer-readable medium storing instructions which, when executed by at least one hardware processor of a computer system, cause the computer system to form an entity map manager and a malware detection engine connected to the entity map manager, wherein:

the entity map manager is configured to construct entity maps specifying groups of inter-related software entities, and further configured to:

in response to a reboot of the computer system and in response to an attempt by a worker entity currently executing on the computer system to access a resource entity stored on a nonvolatile storage device of the computer system, selectively retrieve an entity map from a map repository according to whether the entity map includes a specification of the resource entity, and update the entity map by adding a specification of the worker entity to the entity map, wherein the entity map further includes a specification of another worker entity having executed on the computer system prior to the reboot and a specification of a relation between the other worker entity and the resource entity; and the malware detection engine is configured to determine whether the computer system comprises malicious software according to the updated entity map.

22. The computer system of claim 1, wherein the resource entity comprises a code library.

23. The method of claim 11, wherein the resource entity comprises a code library.

* * * * *